（12） United States Patent
Rudolph et al.

(10) Patent No.: US 9,106,055 B2
(45) Date of Patent: Aug. 11, 2015

(54) GAS FILLED HOLLOW FIBER LASER

(75) Inventors: Wolfgang G. Rudolph, Albuquerque, NM (US); Amarin Ratanavis, Bangkok (TH); Vasudevan Nampoothiri, Albuquerque, NM (US); Kristan L. Corwin, Manhattan, KS (US); Andrew M. Jones, Lafayette, CO (US); Brian R. Washburn, Manhattan, KS (US); Rajesh Kadel, Manhattan, KS (US); John M. Zavada, Arlington, VA (US)

(73) Assignees: STC.UNM, Albuquerque, NM (US); Kansas State University Research Foundation, Manhattan, KS (US); John M. Zavada, Arlington, VA (US)

( * ) Notice: Subject to any disclaimer, the term of this patent is extended or adjusted under 35 U.S.C. 154(b) by 161 days.

(21) Appl. No.: 13/574,550

(22) PCT Filed: Jan. 21, 2011

(86) PCT No.: PCT/US2011/022080
§ 371 (c)(1),
(2), (4) Date: Sep. 25, 2012

(87) PCT Pub. No.: WO2011/142849
PCT Pub. Date: Nov. 17, 2011

(65) Prior Publication Data
US 2013/0202006 A1 Aug. 8, 2013

Related U.S. Application Data

(60) Provisional application No. 61/297,195, filed on Jan. 21, 2010.

(51) Int. Cl.
*H01S 3/30* (2006.01)
*H01S 3/223* (2006.01)
(Continued)

(52) U.S. Cl.
CPC ............. *H01S 3/223* (2013.01); *H01S 3/06741* (2013.01); *H01S 3/2232* (2013.01); *H01S 3/0943* (2013.01); *H01S 3/094003* (2013.01)

(58) Field of Classification Search
CPC .......... G02B 6/02328; G02B 6/02347; G02B 6/02357; H01S 3/06741; H01S 3/094003; H01S 3/305; H01S 3/22; H01S 3/223; H01S 3/225; H01S 3/036; H01S 3/038; H01S 3/097
USPC .......... 372/6, 55–65; 385/122, 123, 124, 125, 385/127, 141; 359/341.1–341.3
See application file for complete search history.

(56) References Cited

U.S. PATENT DOCUMENTS 6,331,993 B1 * 12/2001 Brown ............................. 372/55
6,496,634 B1 * 12/2002 Levenson ...................... 385/125
(Continued)

FOREIGN PATENT DOCUMENTS

JP 2007-088384 A 4/2007

OTHER PUBLICATIONS

JP02007088384 (English translation) May 4, 2007.*
(Continued)

*Primary Examiner* — Colleen A Matthews
*Assistant Examiner* — Delma R Forde
(74) *Attorney, Agent, or Firm* — Schwegman Lundberg & Woessner, P.A.

(57) ABSTRACT

Apparatus, systems, and methods using an optically pumped gas filled hollow fiber laser can be implemented in a variety of applications. In various embodiments, operation of an optically pumped gas filled hollow fiber laser is based on population inversion in the gas. Additional apparatus, systems, and methods are disclosed.

47 Claims, 29 Drawing Sheets

(51) Int. Cl.
  *H01S 3/067* (2006.01)
  *H01S 3/094* (2006.01)
  *H01S 3/0943* (2006.01)

(56) References Cited

U.S. PATENT DOCUMENTS

| | | | |
|---|---|---|---|
| 7,231,122 B2* | 6/2007 | Weisberg et al. | 385/123 |
| 7,327,928 B2* | 2/2008 | Shaw et al. | 385/142 |
| 7,420,662 B2* | 9/2008 | Yalin et al. | 356/72 |
| 8,079,763 B2* | 12/2011 | Benabid | 385/95 |
| 8,229,304 B1* | 7/2012 | Pepper et al. | 398/214 |
| 2006/0078009 A1* | 4/2006 | Katayama et al. | 372/6 |
| 2006/0251369 A1* | 11/2006 | Shaw et al. | 385/125 |
| 2007/0047066 A1* | 3/2007 | Green | 359/326 |
| 2007/0093702 A1* | 4/2007 | Yu et al. | 600/326 |
| 2007/0280304 A1 | 12/2007 | Deile et al. | |
| 2009/0323732 A1* | 12/2009 | Benabid | 372/3 |
| 2014/0048410 A1* | 2/2014 | Benabid et al. | 204/157.43 |

OTHER PUBLICATIONS

F. Benabid et al. "Ultrahigh Efficiency LaserWavelength Conversion in a Gas-Filled Hollow Core Photonic Crystal Fiber by Pure Stimulated Rotational Raman Scattering in Molecular Hydrogen" Physical Review Letters; vol. 93, No. 12; Sep. 17, 2004; pp. 123903-1 through 123903-4.*

F. Benabid et al. "Stimulated Raman Scattering in Hydrogen-Filled Hollow-Core Photonic Crystal Fiber" Science SCIENCE vol. 298; Oct. 11, 2002; pp. 298-399.*

Daniele Faccio et al. "Optical amplification in the near-infrared in gas-filled hollow-core fibers" Optics Letters; vol. 34, No. 19; Oct. 1, 2009; pp. 2918-2920.*

W. Rudolph et al. "Mid-IR Laser Emission from a C2H2 Gas Filled Hollow Core Fiber" ICTON 2010; pp. 1-4.*

A. V. Vasudevan Nampoothiri et al. "Hollow-core Optical Fiber Gas Lasers (HOFGLAS)"; Optical Materials Express; Jul. 1, 2012; vol. 2, No. 7; pp. 948-961.*

Andrew M. Jones et. al. "C2H2 Gas Laser Inside Hollow-Core Photonic Crystal Fiber Based on Population Inversio"; 2010 IEEE; pp. 1-2.*

"International Application Serial No. PCT/US2011/022080, Search Report mailed Aug. 2, 2012", 8 pgs.

"International Application Serial No. PCT/US2011/022080, Written Opinion mailed Dec. 28, 2011", 3 pgs.

"International Application Serial No. PCT/US2011/022080, Written Opinion mailed Dec. 28, 2011", 6 pgs.

Benabid, F, et al., "All-fiber single-mode hollow-core gas cells for stimulated Raman scattering and laser frequency stabilization", 2005 *Conference on Lasers & Electra-Optics (CLEO)*, (2005), 378-380.

County, F., et al., "Sub-Watt Threshold CW Raman Fiber-Gas-Laser Based on H2-Filled Hollow-Core Photonic Crystal Fiber", *CLEO/QELS* 2008, (2008), 2 pgs.

Ihara, K, et al., "Raman Amplification of Continuous-Wave Laser Emission in Hydrogen-Filled Hollow-Core Photonic Crystal Fiber", *CLEO/QELS* 2008, (2008), 1-2.

* cited by examiner

GAS FILLED HOLLOW FIBER LASER

CLAIM OF PRIORITY

This application is a U.S. National Stage Filing under 35 U.S.C. 371 from International Application No. PCT/US20111/022080, entitled "GAS FILLED HOLLOW FIBER LASER," filed Jan. 21 2011, and published as WO 2011/142849 A2 on Nov. 2011, which application claims the benefit of U.S. Provisional Application Ser. No. 61/297,195, filed 21 Jan. 2010, entitled "A GAS FILLED HOLLOW FIBER LASER BASED ON POPULATION INVERSION," which applications are incorporated herein by reference in their entirety.

GOVERNMENT INTEREST STATEMENT

This invention was made with U.S. Government support under grant number W911NF-08-1-0332 and W911NF-05-1-0507 awarded by the Army Research Office, and grant number PHY0722622 awarded by the National Science Foundation. The United States Government has certain rights to the invention.

FIELD OF THE INVENTION

The invention relates generally to lasers, systems using lasers, and use of the same.

BACKGROUND

The need for portable, tunable lasers in the mid-infrared (mid-IR) is compelling. This eye-safe spectral region offers high atmospheric transmission essential to applications such as remote sensing and space-based terrestrial imaging and communications. Quantum cascade lasers (QCLs) have emerged as promising mid-IR sources and have even been integrated with photonic crystal resonator structures. However, QCLs typically operate from 4-10 μm, become multi-mode at high powers, and have thermal management challenges. Optically pumped gas lasers, in which a narrow-band pump laser is resonant with the gas-phase medium, can be pumped in the near-infrared to produce mid-IR emissions, but remain bulky and cumbersome.

Hollow core photonic fibers (HC-PCF) have gained wide attention due to their ability to guide in the hollow core with low attenuation over very great distances. Many nonlinear optical phenomena, including the demonstration of a Raman laser, have been observed in gas filled photonic crystal fibers. Raman lasers have been disclosed that rely on the Raman shift in the gas to shift the wavelength of a laser pulse. Such Raman lasers have many applications including a widely tunable output. However, these lasers also have certain limitations. For example, these lasers do not lend themselves to coherence conversion; that is, one cannot readily pump this laser with multiple incoherent sources and still achieve increased coherent output.

DESCRIPTION

Figure 1:
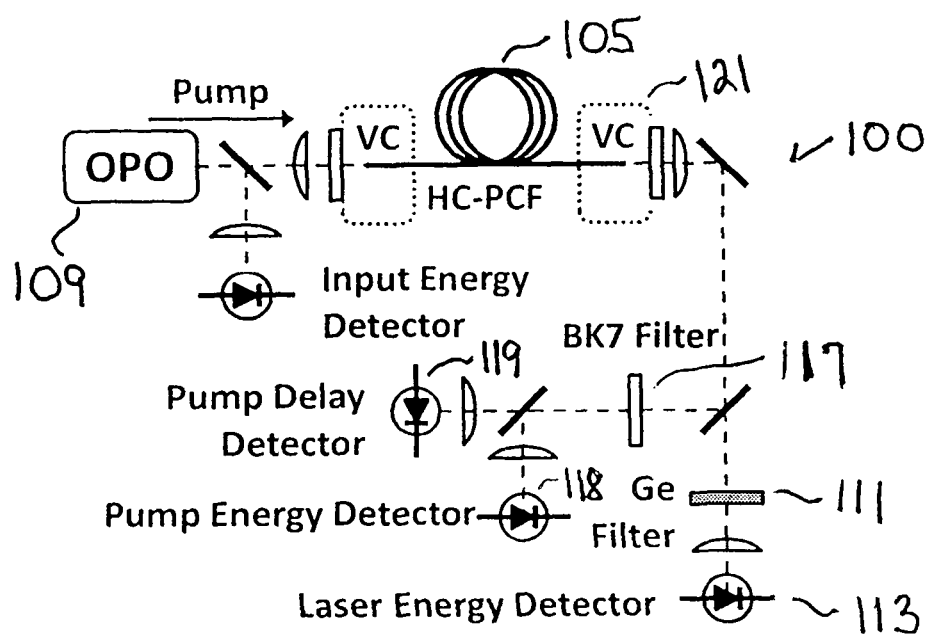
FIG. 1 shows an example experimental setup for a hollow fiber optically pumped gas laser, in accordance with various embodiments.

The following detailed description refers to the accompanying drawings that show, by way of illustration and not limitation, various example embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, lasers based on molecular vapors optically pumped in the near infrared (IR) can be arranged to work inside a waveguide. Such operation may be conducted even in the presence of high loss. A hollow optical fiber can be filled with a gas and the gas can be pumped resonantly with a pump laser such that the gas is excited to emit Stokes-shifted laser radiation based on stimulated emission. The optical fiber confines both the pump field and the laser field. The laser can be structured such that the gain provided is high enough to allow weakly guided modes to overcome the laser threshold. With a relatively long interaction length between the pump laser and the lasing medium and the small area of the optical fiber, a resulting low threshold power and energy can be provided. Lasers constructed in such a manner can operate in a pulsed mode and in a continuous wave (CW) mode.

A gas-filled fiber laser can be implemented that is based on population inversion. Operation based on population inversion is in contrast to the gas based Raman lasers. Further, multiple mutually incoherent pump sources can add to the same population inversion of the gas-filled fiber laser, and thus increase the output of the gas-filled fiber laser as a single coherent laser.

A laser constructed with a hollow optical fiber filled with a gas can include the use of a variety of molecular gases. Optically pumped gas lasers (OPGLs) with molecular gases are attractive candidates for coherent radiation in the mid-infrared. Suitable gases include gases that are able to absorb and emit in spectral regions where the fiber losses are sufficiently small. These molecular gases may include, but are not limited to, acetylene ($C_2H_2$), hydrogen cyanide, (HCN), carbon monoxide (CO), carbon dioxide ($CO_2$), hydrogen bromide (HBr), nitrous oxide ($N_2O$), hydrogen sulfide ($H_{2S}$), and carbonyl sulfide (OCS), $I_2$, DF, HF, IBr, HCl, HI, or any isotopic equivalent of the above gases. An example of a laser constructed with a hollow optical fiber filled with a gas includes, but is not limited to, a hollow optical fiber filled with acetylene that is pumped by light in the fiber-optic telecommunication band, having a laser output at about 3 μm. Such molecular vapor optically pumped lasers can provide high gain, including an acetylene laser at a wavelength of 3.2 μm.

These lasers can be used in various applications. For example, an application can include, but is not limited to, combining the output of mutually incoherent sources into one coherent output beam and generating spectrally narrow laser radiation at different wavelengths.

A gas-filled fiber laser, in accordance with various embodiments of the invention, can be realized in a variety of formats. A gas-filled fiber laser can use a pump source that provides pulses. The pulsed pumped source can be operated with a 5-10 ns pump source duration. However, gas-filled fiber laser structures can use shorter or longer pulses. A gas-filled fiber laser can use a CW pump source. The use of a pulsed pump source or a CW pump source may depend on the application and/or the choice of gas contained in the fiber laser.

Other structural formats for a gas-filled fiber laser, in accordance with various embodiments, can include a sealed or unsealed gas-filled fiber. With the gas-filled fiber sealed, the gas-filled fiber laser can operate without using gas cells external to the fiber. The gas-filled fiber can be placed between two mirrors to form an optical cavity. The gas-filled fiber, between the two minors, can be either sealed or unsealed. The mirrors can be used to seal the gas-filled fiber. Alternatively, the mirrors can be disposed outside the gas enclosed part of the hollow optical fiber such that part of a cavity mode includes free-space. The minors can be either curved or flat. Various permutations of these and other structural formats may be implemented.

A gas-filled fiber laser can be structured with a compact, flexible, and robust design. Various designs allow for use in portable lasers, atmospheric sensing, and frequency references (in CW form). Multiple gas-filled fiber lasers can be combined and phase-locked together. Gas-filled fiber lasers with small Stokes shifts can be used to coherently combine mutually incoherent pump laser sources.

In various embodiments, a laser can be structured as an optically pumped gas laser (OPGL) based on population inversion in a hollow core photonic crystal fiber (HC-PCF). For example, lasing from population inversion can be generated from gas contained in a hollow-core kagome structured photonic crystal fiber. Laser pulses in the mid-IR (3.1-3.2 μm) can be generated by optically pumping at a wavelength λ, of approximately 1.5 μm. The optical pumping may be provided as nanosecond pulses. An optically pumped HC-PCF gas laser includes characteristics of OPGLs including high damage thresholds and the potential for coherent emission from mutually incoherent pump sources. Furthermore, as with OPGLs having molecular gases, optically pumped HC-PCF gas lasers offer a variety of mid-IR wavelengths specifically in the eye-safe wavelengths within the atmospheric transmission window. Creating an OPGL inside hollow fiber allows for confining the pump light and laser light over long interaction lengths in a compact configuration. Kagome structured fiber offers very broad guiding bandwidths, well suited to optically pumped HC-PCF gas lasers in which the pump and lasing wavelengths differ by about a factor of two.

FIG. 1 shows an example experimental setup for a hollow fiber OPGL. In an example embodiment, acetylene gas ($C_2H_2$) inside a HC-PCF 105 provides a fiber OPGL 100, in which nanosecond pulses excite the acetylene gas inside HC-PCF 105. HC-PCF 105 filled with acetylene can be pumped using a nanosecond optical parametric oscillator (OPO) 109. Incident pump energy, pump energy through the fiber, mid-IR laser pulse energy, and pump-to-laser pulse delay can be monitored simultaneously. A germanium wafer 111 transmits mid-IR laser pulses while attenuating pump pulses to below the noise level of a HgCdTe laser energy detector 113. A BK7 optical glass window 117 can be used as a filter to absorb mid-IR laser energy before pump energy detector 118 and timing detector 119. Other suitable filters can be used to separate laser emission from the pump signal.

OPO 109 can be used as a pulsed pump source that can generate output pulses 5-6 ns in duration with average pulse energies of approximately 5 mJ. Other duration times and average pulse energies can be used. OPO 109 can be tuned to resonance with the $v_1+v_3$ (R7) transition in $^{12}C_2H_2$, $\lambda$=1521.06 nm. These pulses can be directed into a vacuum chamber 121 containing HC-PCF 105 as a single-cell kagome structured optical fiber of 1.65 m length. Kagome HC-PCF 105 exhibits strong guiding in the near IR pump region (loss approximately 0.75 dB/m) and weak guiding behavior near 3 μm (approximately 20 dB/m). The gain of laser 100 may be sufficient such that laser 100 can be structured without a cavity, in spite of a large fiber loss in the lasing band. Thus, laser 100 can operate without minors to form a cavity. Additionally, optical electromagnetic radiation to pump the laser can be coupled into one end of HC-PCF 105.

Figure 2:
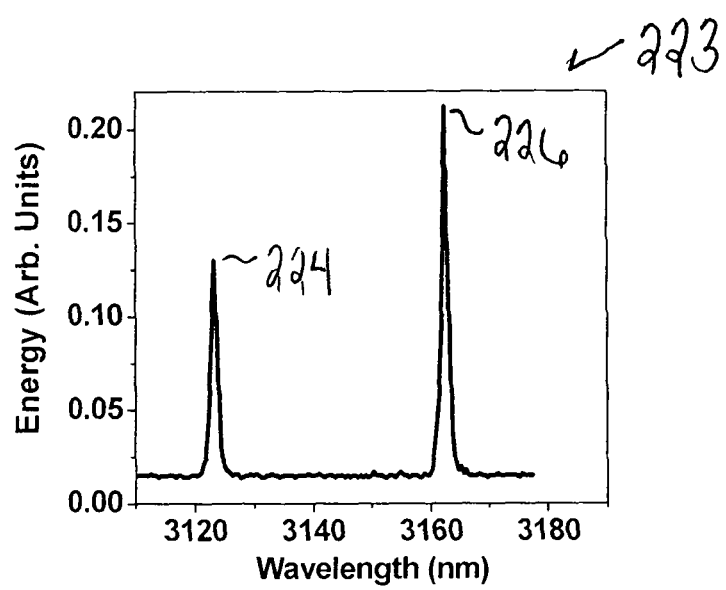
FIG. 2 shows a spectrum of laser output of the laser of FIG. 1, in accordance with various embodiments.

FIG. 2 shows a spectrum 223 of laser output of laser 100 of FIG. 1. Spectral output 223 from OPGL 100, shown for an approximately 7 torr acetylene gas pressure, contains two peaks 224 and 226 located near 3.12 μm and 3.16 μm, respectively. Peaks 224 and 226 respectively correspond to (R7) and (P9) rotational transitions between the $v_1+v_3$ and $v_1$ vibrational levels.

Figure 3:
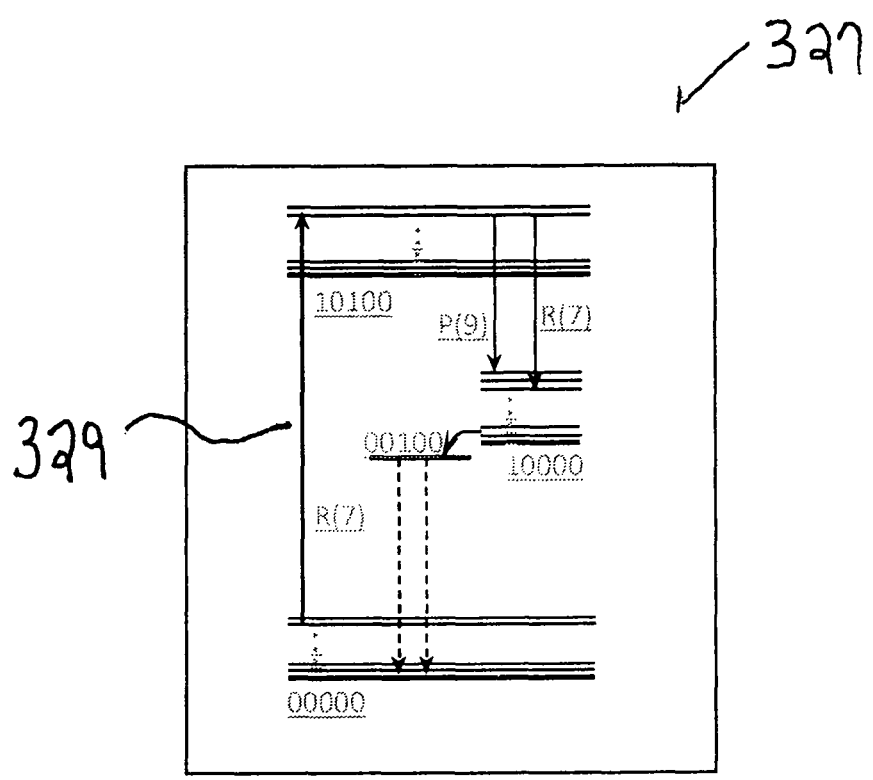
FIG. 3 shows a simplified energy level diagram of $C_2H_2$ showing the pump and two laser transitions for the operation of the example setup of FIG. 1, in accordance with various embodiments.

FIG. 3 shows a simplified energy level diagram 327 of $C_2H_2$ showing the pump and two laser transitions for the operation of the example setup of FIG. 1. OPO pump 109, tuned to the (R7) rotational transition, energy difference 329 corresponding to $\lambda$=1521.06 nm, moves population from the J=7 rotational state of the ground state vibrational manifold to the J=8 rotational state of the $v_1+v_3$ vibrational manifold. This creates an immediate population inversion between the J=8, $v_1+v_3$ state and the essentially empty $v_1$ vibrational state ($N_e/N_o$ approximately exp $[-hv_1/kT]=9\times10^{-8}$) resulting in the possibility of population transfer via the allowed (R7) and (P9) dipole transitions to the J=7 and J=9 rotational states. This results in the transition from the J=8, $v_1+v_3$ state to the allowed rotational states of $v_1$ vibrational state. Using the known molecular constants for the $v_1$ and $v_1+v_3$ states, the two peaks are identified as the R(7) and P(9) transitions, which originate from the pump level of the $v_1+v_3$ vibrational state and terminate at the J=7 and J=9 of the $v_1$ vibrational state. In experiments, pulsed laser output for the example setup of FIG. 1 was observed for gas pressures between 0.5 torr and 20 torr.

Figure 4:
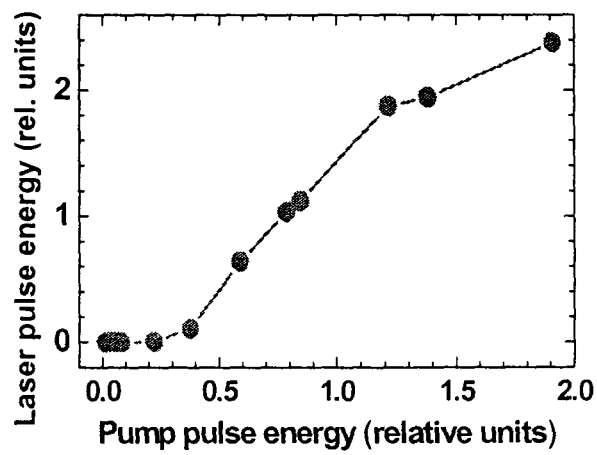
FIG. 4 shows a plot of the laser pulse energy output versus pump pulse energy for an acetylene pressure of seven torr in the setup of FIG. 1, in accordance with various embodiments.

FIG. 4 shows a plot of the laser pulse energy output versus pump pulse energy for an acetylene pressure of 7 torr in the setup of FIG. 1. The curve in FIG. 4 indicates the onset of saturation as the increasing pump pulse energy starts to saturate the absorption transition. At lower pressures, saturation is more pronounced.

Figure 5:
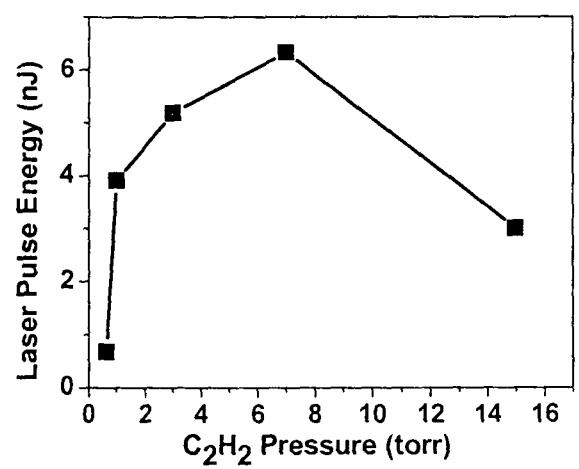
FIG. 5 shows a plot of mid-infrared laser pulse energy versus acetylene pressure for several acetylene pressures in the setup of FIG. 1, in accordance with various embodiments.

FIG. 5 shows a plot of mid-IR laser pulse energy versus acetylene pressure when pumped at 30 μJ incident input pulse energy for several acetylene pressures inside the HC-PCF 105 in the setup of FIG. 1. The lasing output is plotted as a function of acetylene pressure for pump energies of 600 nJ coupled into the fiber (30 μJ incident on the fiber). The coupling efficiency for the measurements of FIG. 5 was approximately 2%. Values exceeding 50% into a kagome fiber have been demonstrated. The temporal delay between the pump and laser pulses was also measured, and varied from less than 1 ns to greater than 10 ns. Shorter delays can be observed when the pump power is further above threshold, when population inversion builds up more quickly. The lasing threshold, defined as the minimum pump pulse energy coupled into the fiber necessary to observe mid-IR laser output, is about 200 nJ for the setup as operated, and varies with pressure. The slope efficiency of the laser, defined as the change in output energy divided by the change in pump energy coupled into the fiber, was a few percent for the setup as operated in experiments due mainly to linear losses of the fiber at the laser wavelengths. From modeling, 25% slope efficiency and pulse energies of a few mJ are predicted. A different kagome design with lower losses at the laser wavelength can also increase the efficiency.

Reduction of the kagome fiber loses of HC-PCF 105 at the laser wavelength should substantially increase the slope efficiency and decrease the threshold. Furthermore, the addition of an optical cavity or increased kagome fiber length may also improve laser performance. Though the example setup of FIG. 1 provides a first demonstration of a HC-PCF OPGL, which uses a pulsed pump, a gas-filled fiber laser can be pumped with continuous wave laser sources.

Figure 6:
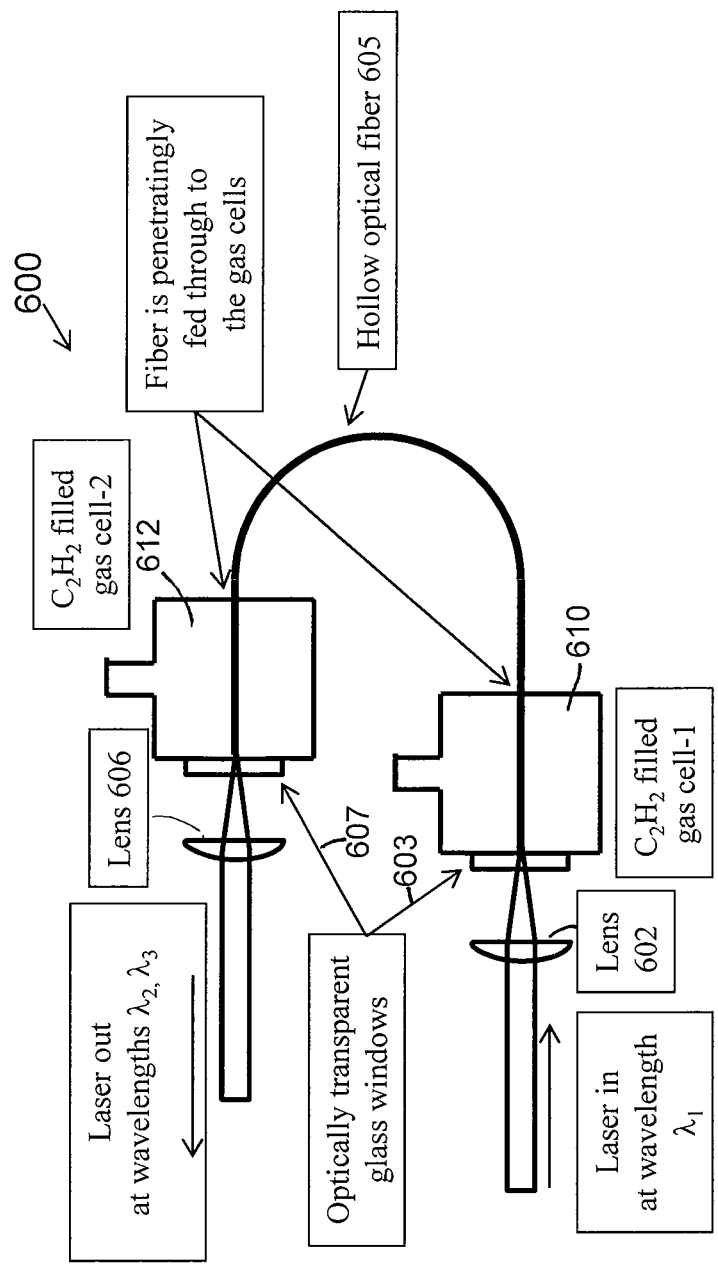
FIG. 6 shows a schematic of an example embodiment of a hollow core optically pumped fiber laser, in accordance with various embodiments.

FIG. 6 shows a schematic of an example embodiment of a hollow core optically pumped gas laser 600. HC-OPGL 600 includes hollow optical fiber 605 that is fed into gas cells 610 and 612 through sides of gas cells 610 and 612. Laser input at wavelength $\lambda_1$ can be input to gas cell 610 through lens 602 and window 603, which can be an optically transparent window. Gas cell 610 includes a gas able to absorb and emit in spectral regions where the fiber losses are sufficiently small such that gain provided by population inversion is sufficient to overcome the losses. The gas, filling gas cell 610, can be realized as $C_2H_2$ or other appropriate gas. At the other end of hollow optical fiber 605, gas cell 612 can also be filled with $C_2H_2$ or other appropriate gas. Laser output from HC-OPGL 600 can be output from gas cell 612 through window 607, which can be an optically transparent window, and lens 606. The laser output can include laser output at wavelengths $\lambda_2$ and $\lambda_3$.

Figure 7:
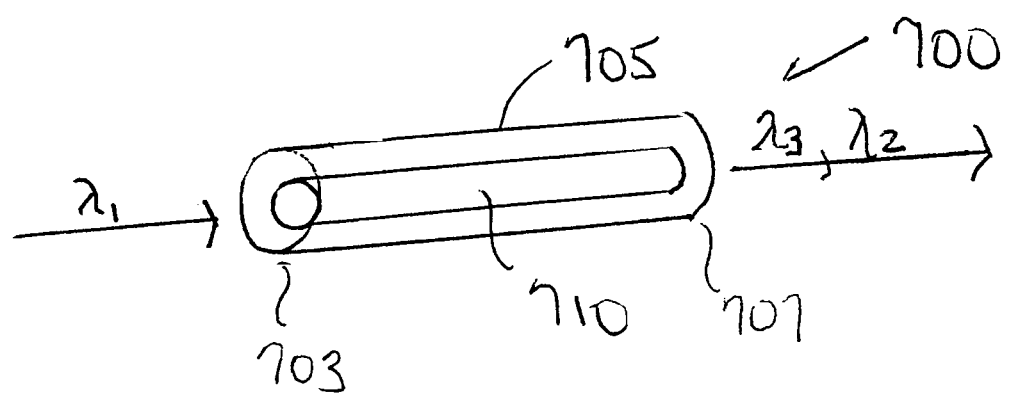
FIG. 7 shows a schematic of an example embodiment of a structure operable as a hollow core optically pumped gas laser, in accordance with various embodiments.

FIG. 7 shows a schematic of an example embodiment of a structure operable as a hollow core optically pumped gas laser 700. HC-OPGL 700 includes hollow optical fiber 705 filled with a gas 710. Hollow optical fiber 705 can be configured with seals 703 and 707 at the ends of hollow optical fiber 705 confining gas 710 in hollow optical fiber 705. An input laser pump signal at wavelength $\lambda_1$ can be selected such that lasing results in hollow optical fiber 705 with light output at wavelengths $\lambda_2$ and $\lambda_3$ based on population inversion in gas 710. The selection of the wavelengths $\lambda_1$, $\lambda_2$, and $\lambda_3$ can depend on the gas selected to fill hollow optical fiber 705. The gas selected may be based on the selected gas being operable in the selected HC-OPGL 700 to provide sufficient gain to overcome relatively large fiber losses. Furthermore, some pump light may exit the fiber. In addition, the laser may emit additional wavelengths from additional rotational states (populated for example by rotational relaxation) or in a cascade involving lower vibrational states.

As taught herein, in various embodiments, an apparatus can comprise a hollow optical fiber and a gas filling the hollow optical fiber, where the gas can be selected such that the hollow optical fiber filled with the gas is operable as a laser based on population inversion generated in the gas. The hollow optical fiber can comprise a hollow core photonic crystal fiber. The gas filling the hollow optical fiber can include one of acetylene ($C_2H_2$), hydrogen cyanide, (HCN), carbon monoxide (CO), carbon dioxide ($CO_2$), hydrogen bromide (HBr), nitrous oxide ($N_2O$), hydrogen sulfide ($H_2S$), or carbonyl sulfide (OCS), iodine gas (I$_2$), deuterium fluoride (DF), hydrogen fluoride (HF), Iodine bromide (IBr), hydrogen chloride (HCl), and hydrogen iodide (HI). Of interest are molecular gases, which can be excited by an optical pump and where the excitation leads to a population inversion. Rotational, vibrational and electronic states can be involved in the excitation and lasing process depending on the actual molecule. Other gases or gas mixtures can be utilized. For example, atomic gases are of interest, which can be excited by an optical pump and where the excitation leads to a population inversion between electronic states. A buffer gas can be used, where the buffer gas is selected to mitigate thermal effects, adjust molecular relaxation rates, provide for energy transfer, or combinations thereof.

The apparatus can include a pump laser arranged to direct a pump laser signal into the hollow optical fiber, where the pump laser signal has a wavelength corresponding to absorption by the gas to attain the population inversion. The pump laser signal can have a wavelength shifted by a nonlinear optical process to become resonant with the gas during propagation through the fiber. The wavelength of the pump laser signal can be converted through nonlinear optical processes while radiation propagates through the fiber. In an example embodiment, the wavelength of the pump laser signal can differ from a wavelength of a laser output from the hollow optical fiber by about a factor of two, when pumped by the pump laser. The wavelength of the pump laser signal can differ from a wavelength of a laser output by factors other than two. The pump laser can include an optical parametric oscillator. Further, the apparatus can include filters to separate an output of the hollow core fiber at the wavelength of the pump laser signal from an output of the hollow core fiber at a wavelength corresponding to the hollow core fiber filled with the gas lasing based on the population inversion of the gas. The hollow optical fiber filled with the gas can be sealed. The sealed hollow optical fiber can be configured between two minors forming an optical cavity.

As taught herein, in various embodiments, an apparatus can comprise a hollow optical fiber and a gas cell to provide a gas to fill the hollow optical fiber with the gas, where the gas can be selected such that the hollow optical fiber filled with the gas is operable as a laser based on population inversion generated in the gas. The hollow optical fiber operable with the gas cell can comprise a hollow core photonic crystal fiber. One end of the hollow optical fiber can be disposed in the gas cell and a second end of the hollow optical fiber can be disposed in a second gas cell. The gas provided using the gas cell can include one of acetylene (C$_2$H$_2$), hydrogen cyanide, (HCN), carbon monoxide (CO), carbon dioxide (CO$_2$), hydrogen bromide (HBr), nitrous oxide (N$_2$O), hydrogen sulfide (H$_2$S), or carbonyl sulfide (OCS), I$_2$, DF, HF, IBr, HCl, HI, or an isotopic equivalent thereof. Other gases or gas mixtures can be utilized. A buffer gas can be used, where the buffer gas is selected to mitigate thermal effects, adjust molecular relaxation rates, provide for energy transfer, or combinations thereof.

In addition to the hollow optical fiber and the gas cell, the apparatus can include a pump laser arranged to direct a pump laser signal into the hollow optical fiber, where the pump laser signal has a wavelength corresponding to absorption by the gas to attain the population inversion. The pump laser can include an optical parametric oscillator or an optical parametric amplifier. Alternate pump sources, some of which are most useful for a continuous wave version of the laser, can include diode lasers (including bars of multiple diode lasers), fiber lasers, vertical cavity surface-emitting laser (VCSEL's), and other suitable light sources. Nonlinear processes can be used to shift a non-resonant pump into resonance with the pumping transition in the gas. Any pump source that is able to produce a population inversion and that can be coupled to the fiber can be used. Furthermore, the gas-fiber laser output can coherently combine the output of mutually incoherent pump sources.

The hollow optical fiber, operable with the gas cell, can be configured between two minors forming an optical cavity. The hollow optical fiber between the two minors can be unsealed.

As taught herein, in various embodiments, features of a method of operating a laser can comprise optically pumping a hollow fiber, where the hollow fiber is filled with a gas, such that a population inversion is generated in the gas, and providing a laser output from the hollow fiber resulting from the population inversion generated. Optically pumping the hollow fiber filled with the gas can include optically pumping a hollow core photonic crystal fiber filled with the gas. Optically pumping the hollow fiber filled with the gas can include optically pumping a hollow fiber filled with one of acetylene (C$_2$H$_2$), hydrogen cyanide, (HCN), carbon monoxide (CO), carbon dioxide (CO$_2$), hydrogen bromide (HBr), nitrous oxide (N$_2$O), hydrogen sulfide (H$_2$S), or carbonyl sulfide (OCS), I$_2$, DF, HF, IBr, HCl, HI, or an isotopic equivalent thereof. Other gases or gas mixtures can be utilized. A buffer gas can be used, where the buffer gas is selected to mitigate thermal effects, adjust molecular relaxation rates, provide for energy transfer, or combinations thereof. In addition to optically pumping a hollow fiber filled with a gas, a method of operating a laser can include using multiple mutually incoherent pump sources to add to the population inversion of the gas and to increase the amount of the laser output from the hollow fiber resulting from the population inversion.

Optically pumping the hollow fiber filled with the gas can include using a pulsed pumped source. Using the pulsed pumped source can include using a pulsed pumped source operated with a pump source duration in the range from about 5 ns to about 10 ns. Optically pumping the hollow fiber filled with the gas can include using a continuous wave pump source.

In various embodiments, prior to optically pumping the hollow fiber, a method can include filling the hollow fiber with the gas. The gas can include filling the hollow fiber with one of acetylene (C$_2$H$_2$), hydrogen cyanide, (HCN), carbon monoxide (CO), carbon dioxide (CO$_2$), hydrogen bromide (HBr), nitrous oxide (N$_2$O), hydrogen sulfide (H$_2$S), or carbonyl sulfide (OCS), I$_2$, DF, HF, IBr, HCl, HI, or an isotopic equivalent thereof. Other gases or gas mixtures can be utilized. In various embodiments, an apparatus and methods of operating the apparatus can include a gas filled hollow optical fiber operable as a laser based on population inversion of the gas. The gas filled hollow optical fiber can be arranged as an optical amplifier to provide seed light when optically pumped. The gas filled hollow optical fiber arranged as a laser based on population inversion can be operably combined with nonlinear frequency conversion of a pump signal and/or laser radiation of the gas filled hollow optical fiber laser. The apparatus can include one or more additional gases operably excited through energy transfer from the optically pumped gas such the excited additional gases are inverted and act as an active laser medium. The gas filled hollow optical fiber can be arranged such that when optically pumped, the gas filled hollow optical fiber and the generated population inversion operate as an optical amplifier, amplifying continuous way and/or pulsed optical signals. The apparatus can be operable to modify output signal radiation from such an optical amplifier using nonlinear processes.

In an example embodiment, an OPGL can include an optically pumped $H^{12}C^{14}N$ gas laser in a HC-PCF. The laser can produce mid-IR (3.15 and 3.09 µm) radiation by optically pumping with 1.54 µm pump signal. The optically pumping can be conducted using optical pulses, for example, 1 ns pulses. Other pulse durations can be used.

Compared to traditional gas laser geometries that use gas cells, optically pumped gas lasers in a HC-PCF may offer a number of enhancements. A kagome structured HC-PCF can serve as a cavity that permits long interaction lengths between the pump and gas medium leading to a confinement area on the order of 100 µm² over distances of tens of meters. Furthermore, a kagome HC-PCF permits ultra-broad, multi-octave spanning spectral guidance, with reasonably low loss (<1 dB/m, which may be reduced to <0.5 dB/m) across a broad spectrum, and can be spliced to solid-core fibers, creating compact, robust sealed gas cells. Furthermore, there are many molecular gases that can be pumped at approximately 1.5 µm to produce mid-IR lasing. Depending on the gas, other pump wavelengths may be used.

Figure 8:
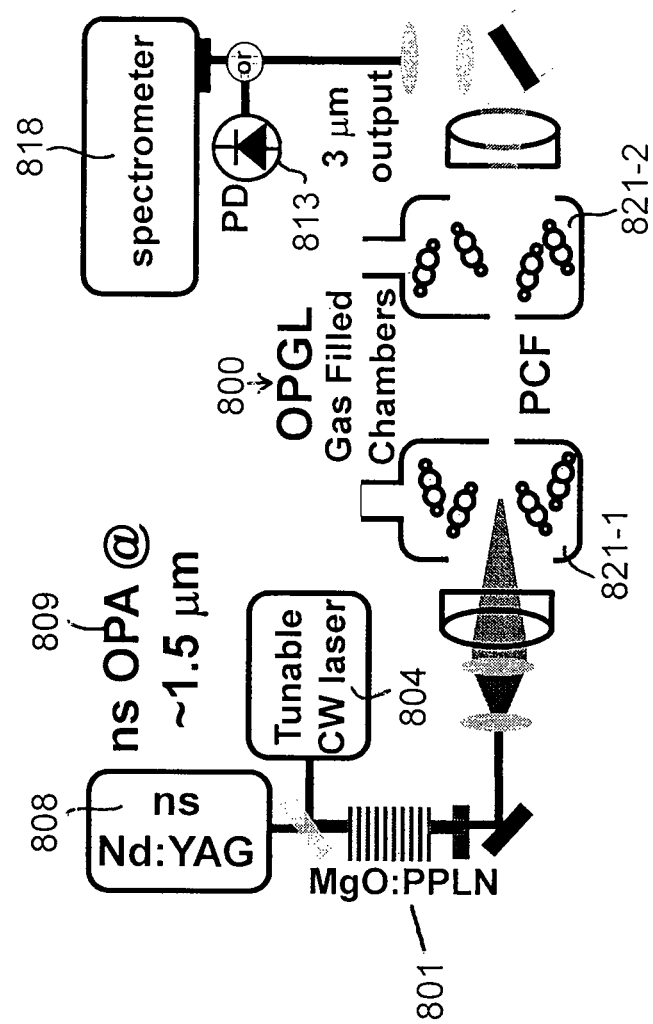
FIG. 8 shows an experimental setup which includes an optically pumped gas laser having chambers for holding gases, in accordance with various embodiments.

FIG. 8 shows an experimental setup which includes an OPGL 800 having chambers 821-1, 821-2 for holding gases. Alternatively, an OPGL configured as an optically pumped gas laser in a HC-PCF can be structured with the gas filling the HC-PCF and the HC-PCF sealed at the ends of the HC-PCF, without using gas chambers to provide the gas. Chambers 821-1, 821-2 are not limited to containing one particular gas, but can be used to contain the gas selected for a particular application. An optical parametric amplifier (OPA) 809 can be used to amplify a seed laser signal produced from a tunable near-infrared CW laser 804. Pulses 1 ns in duration from a Nd:YAG laser 808 can be mixed with the seed laser signal from CW laser 804 in a nonlinear crystal 801, such a MgO:PPLN (periodically poled lithium niobate) structure, to produce 20 µJ pulses at approximately 1.5 µm. Other suitable filters can be used to separate laser emission from the pump signal and to direct the various light signals in the setup.

With $C_2H_2$ used in chambers 821-1, 821-2, to pump the laser, OPA 809 can be tuned to 1.533 µm corresponding to excitation of the $v_1+v_3$ P(13) transition in $C_2H_2$. The pulses can be coupled (with 50% efficiency) into vacuum chambers 821-1 containing a single-cell kagome structured optical fiber 805 having a length of 33 cm, for example. Kagome fiber 705 exhibits strong guiding in the near-IR pump region (loss of approximately 0.75 dB/m) and weak guiding at 3 µm (loss of approximately 20 dB/m). The spectral and temporal measurements of the mid-IR output can be recorded with a spectrometer 818 and a fast photodiode 813.

Figure 9:
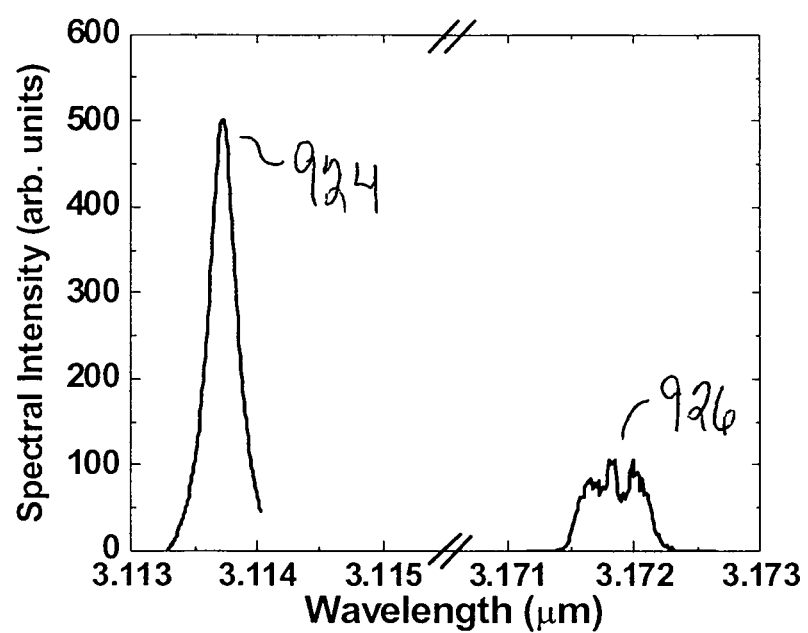
FIG. 9 shows the spectrum of a $C_2H_2$ laser pumped at 1.533 μm, in accordance with various embodiments.
Figure 10:
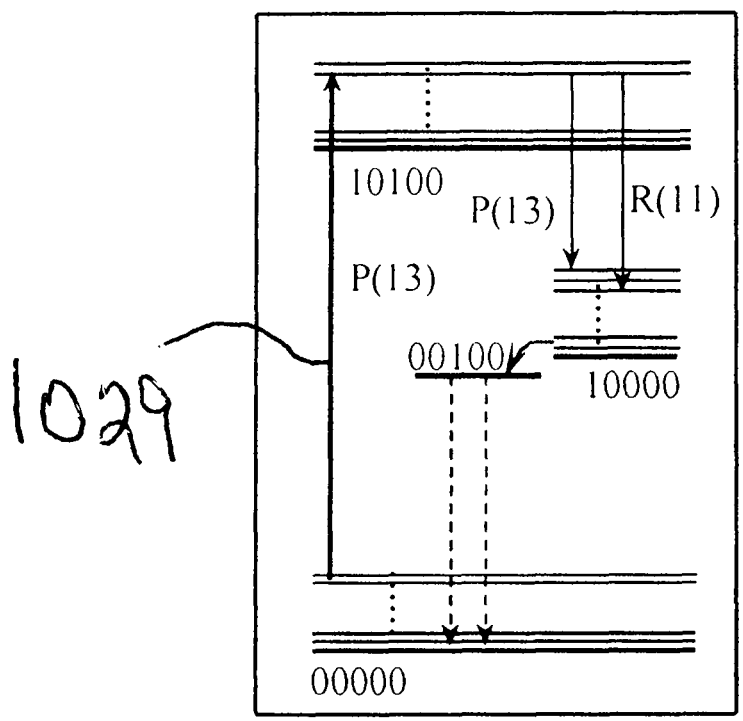
FIG. 10 shows the $C_2H_2$ energy transitions corresponding to the spectrum of FIG. 9 for a 1.533 μm pump wavelength, in accordance with various embodiments.

FIG. 9 shows the spectrum of a $C_2H_2$ laser pumped at 1.533 µm. The two peak regions 924 and 926 shown correspond to transitions from the J=12, $v_1+v_3$ pump state to the J=11 and J=13, $v_1$ state. FIG. 10 shows the $C_2H_2$ energy transitions corresponding to the spectrum of FIG. 9 for the energy difference 1029 corresponding to $\lambda=1.533$ µm pump wavelength.

Figure 11:
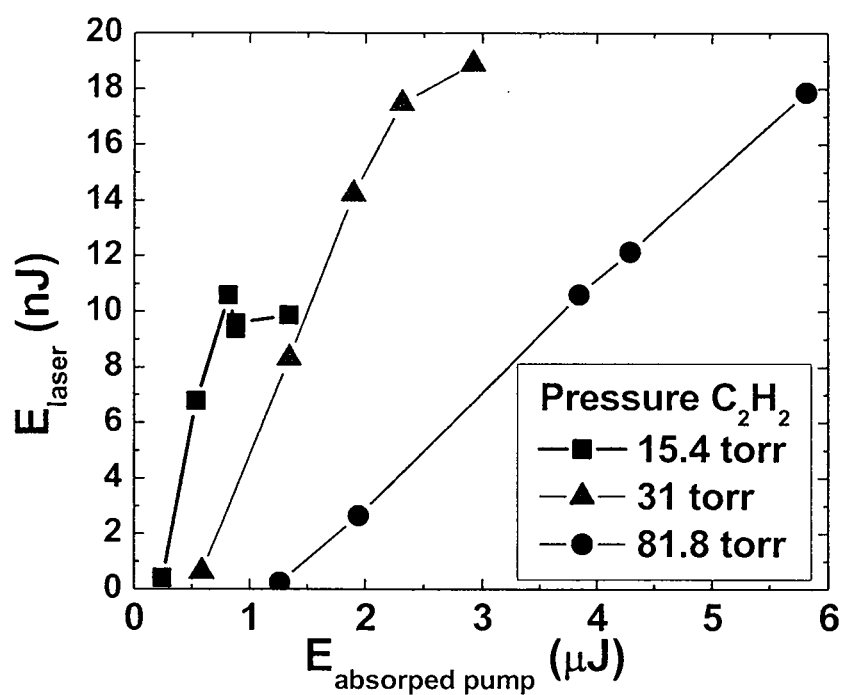
FIG. 11 shows $C_2H_2$ laser output energy as a function of absorbed pump energy for different gas pressures, in accordance with various embodiments.

FIG. 11 shows $C_2H_2$ laser output energy as a function of absorbed pump energy for different gas pressures. The output is mid-IR energy for absorbed near-IR pump energy. In this arrangement, the optimal pressure was about 31 torr for the pressures used.

The effect of collisions with a buffer gas on the $C_2H_2$ laser efficiency can be examined. Using the $C_2H_2$ filled HC-PCF laser configuration in the example setup of FIG. 1, experiments were made for varying active gas/buffer gas mixtures. For these measurements, $C_2H_2$ pressure was kept constant at 7 torr. Helium (He) was used as the buffer gas.

Figure 12:
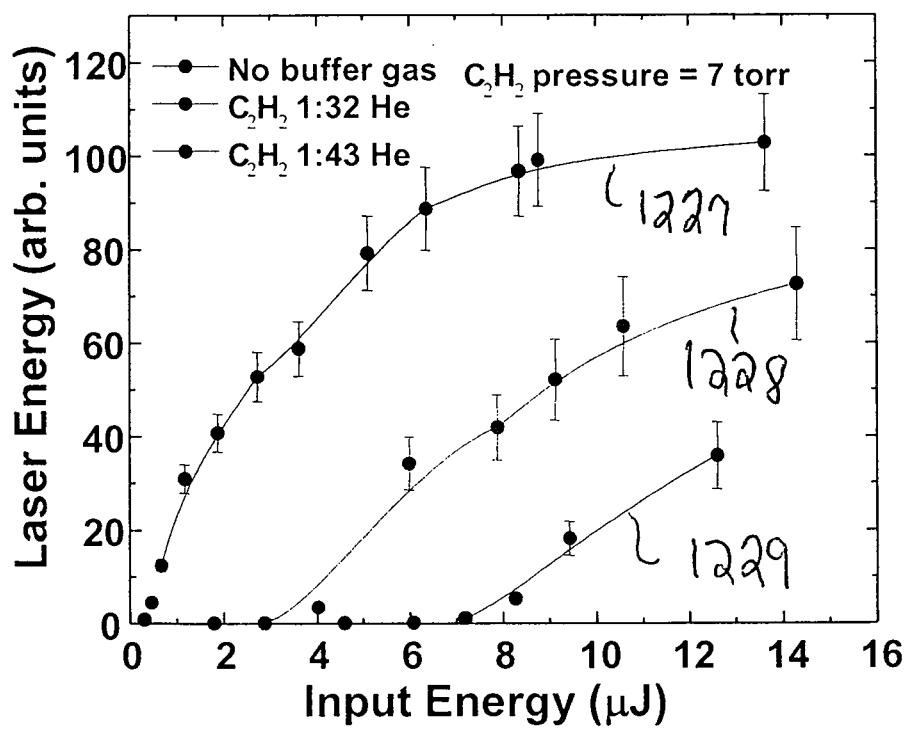
FIG. 12 shows the measured laser output as a function of input pump energy for various helium pressures, in accordance with various embodiments.

FIG. 12 shows the measured laser output as a function of input pump energy for various He pressures. Curve 1227 shows the results with no buffer gas. Curve 1228 shows the results with a $C_2H_2$:He ratio of 1:32. Curve 1227 shows the results with a $C_2H_2$:He ratio of 1:43. It can be seen that the addition of a buffer gas increases the lasing threshold and reduces the laser efficiency. The reduction in efficiency may be attributed to the combined effect of reduced pump absorption due to pressure broadening and increased relaxation rates out of the excited states.

The experimental setup of FIG. 8 can be used with $C_2H_2$ replaced with HCN to provide lasing in a $H^{12}C^{14}N$ filled HC-PCF. Fiber 805 in FIG. 8 can be filled with HCN gas and pumped at 1.541 µm to attain the P(10) transition to the $2v_3$ band. Lasing at 3.147 and 3.091 µm can be measured corresponding to the R(8) and P(10) transitions to the $v_1$ band. In various embodiments, a HC-PCF laser format can be used for multiple molecular gases, other than $C_2H_2$ and HCN, to generate mid-IR radiation.

Figure 13:
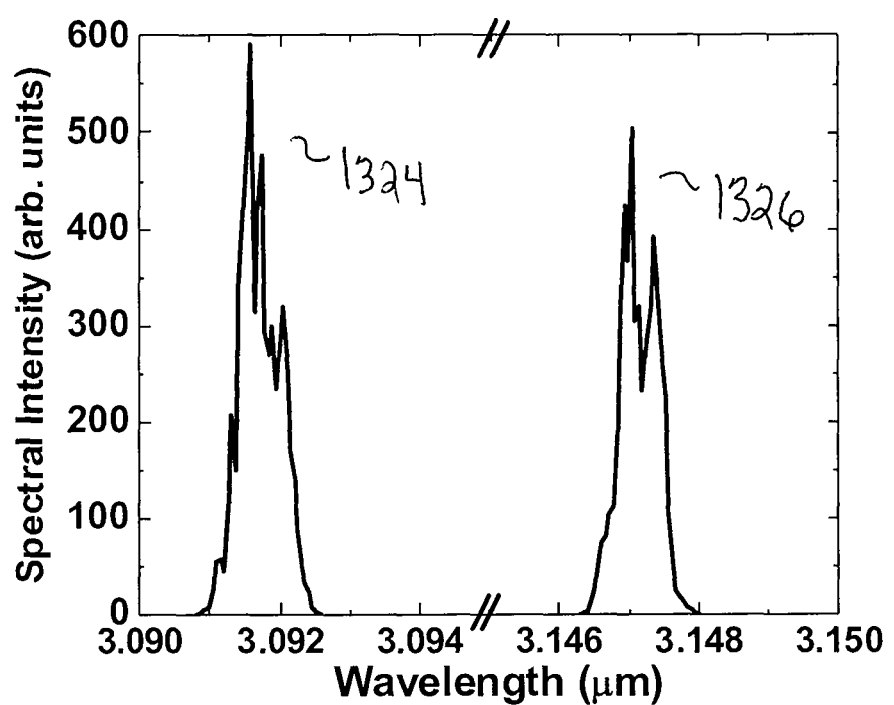
FIG. 13 shows the spectrum of the HCN laser pumped at 1.541 μm at two gas pressures in the chambers of FIG. 8, in accordance with various embodiments.
Figure 14:
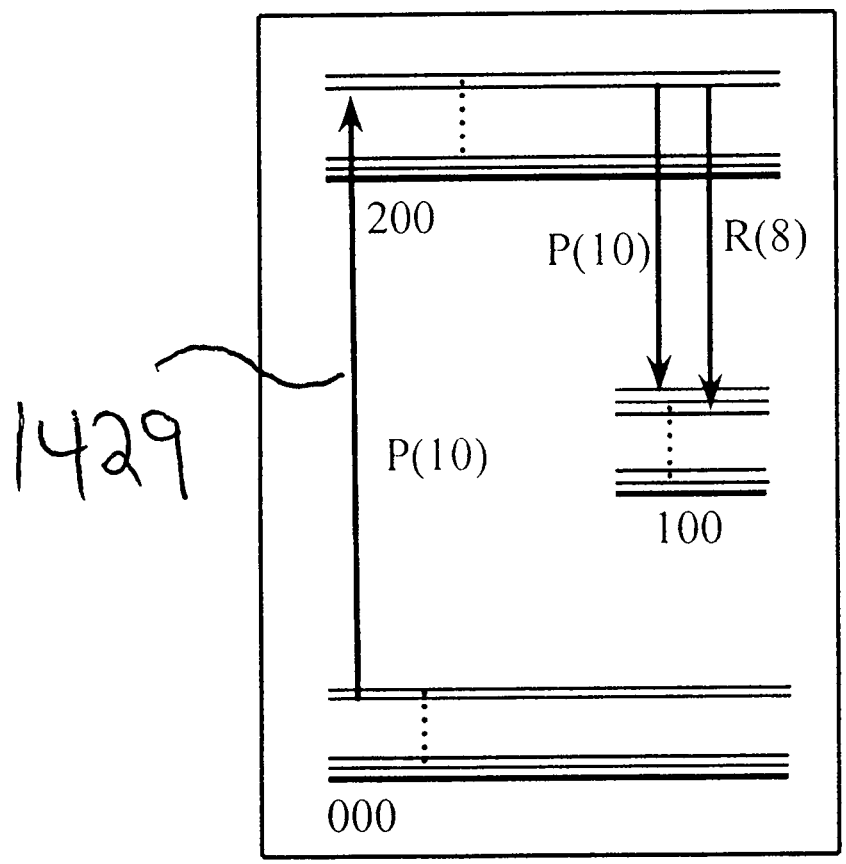
FIG. 14 shows energy transitions in HCN corresponding to a 1.541 μm pump wavelength, in accordance with various embodiments.

FIG. 13 shows the spectrum of the HCN laser pumped at 1.541 µm with gas pressures in chambers 821-1, 821-2 at 12.8 and 18.8 torr. The two peaks 1324 and 1326 correspond to transitions from the J=9, $2v_3$ pump state to the J=8 and J=10, $v_3$ state, as reflected in the HCN energy transitions for the energy difference 1429 corresponding to $\lambda=1.541$ µm pump wavelength as shown in FIG. 14.

In various embodiments, a HC-PCF based laser cavity can provide a universal laser configuration for optically pumped molecular gas lasers with potential low threshold and high slope efficiency with the molecular gas in the HC-PCF. Such configurations may be used in applications using coherent beam combination among multiple fibers.

Optically pumped molecular lasers (OPML) are effective wavelength converters for generating coherent radiation in the mid-infrared, a spectral region of great interest in applications such as remote sensing and imaging through the atmosphere. These lasers can also be potentially useful as a means to combine output of several incoherent laser sources into one coherent output beam. In order to efficiently deposit energy to the active gas, whose line widths are typically smaller than a few GHz, narrow band pump sources are typically necessary. Recent advancements in spectral narrowing of high-power diode lasers and fibers lasers make these lasers systems well suited for the optical pumping of gases. For example, diode laser pumped atomic vapor lasers have been demonstrated and reached output powers exceeding 40 W in the near infrared spectral region. Conventional beam combining and power scaling in the 1.5 µm region can be performed using solid core fiber systems. However, power scaling in solid core fibers is often limited due to parasitic nonlinear effects e.g., stimulated Brillouin scattering.

In various embodiments, gas filled hollow core fibers are configured and operated to lase at desired wavelengths. These gas filled hollow core fibers can avoid the above stated issues, while still capitalizing on the characteristics of fiber systems, such as compactness, long interaction length of pump and laser as well as confinement of modes to small volumes. These gas filled hollow core fiber structures effectively combine a fiber laser with a gas laser by mating an appropriate gas with an appropriate hollow core fiber structure.

Gases have high damage thresholds and offer many possible (eye-safe) emission wavelengths in the atmospheric transmission window. In addition, the selection of the appropriate gas may depend on its application. For example, in beam combining, gas molecules can be used, whose absorption spectra match widely available narrow band fiber and/or diode lasers. Examples of such gases includes, but are not limited to, molecular $C_2H_2$ and HCN due to their strong absorption bands in the low-loss optical-fiber telecommunications window (approximately 1.5 µm), where diode and fiber optics technology is well advanced.

An appropriate hollow core optical fiber includes hollow core photonic crystal fibers (HC-PCF), since they can have transmission losses as low as 1.2 dB/km at 1.5 µm. In addition, kagome lattice based HC-PCFs have larger bandwidth compared to photonic band gap based hollow core fibers and exhibit multiple transmission regions with relatively low loss. In example embodiments of a gas filled hollow core fiber, as discussed herein, lasing can be provided by a $C_2H_2$ or HCN gas filled kagome HC-PCF when pumped in the 1.5 µm region. Other lasers can be used to provide an OPML having a hollow core optical fiber, such as, but not limited to, a kagome HC-PCF.

Figure 15:
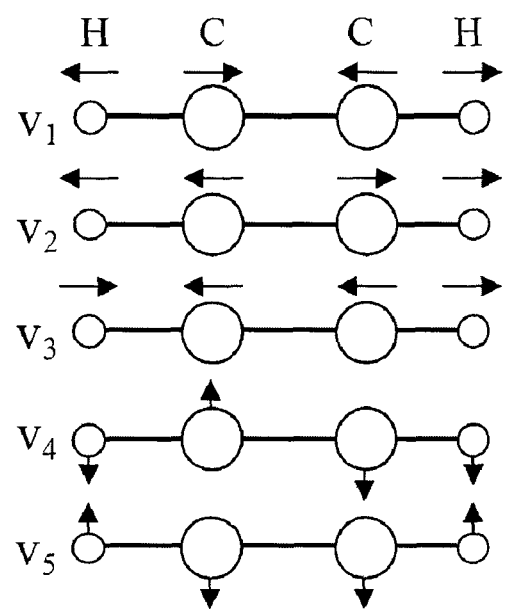
FIG. 15 shows normal vibrational modes of $C_2H_2$.
Figure 16:
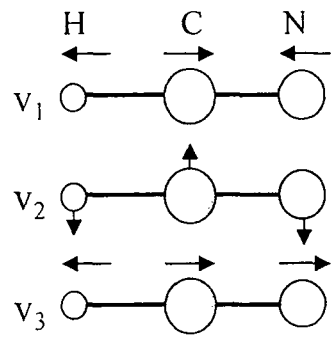
FIG. 16 shows normal vibrational modes of HCN.
Figure 17:
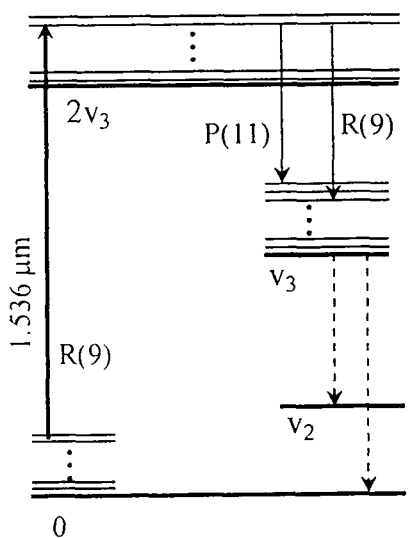
FIG. 17 shows a R branch pump transition from J=9 to J=10 and observed laser transitions at about 3100 nm and 3170 nm for HCN, in accordance with various embodiments.

FIG. 15 shows normal vibrational modes of $C_2H_2$. FIG. 3 shows an R branch pump transition, for $C_2H_2$, from J=7 to J=8 and observed laser transitions at about 3120 nm and 3160 nm are shown. FIG. 16 shows normal vibrational modes of HCN. FIG. 17 shows an R branch pump transition from J=9 to J=10 and observed laser transitions at about 3100 nm and 3170 nm for HCN. The associated vibrational energies in FIGS. 15 and 16 are identified as $v_{1...5}$ for $C_2H_2$, and $v_{1...3}$ for HCN. For each vibrational level, there is a rotational ladder, the spacing of which to first order is given by 2B(J+1), where B is the rotational constant of the particular vibrational state and J is the rotational quantum number. For example, the rotational constant for $C_2H_2$ for the $v_1+v_3$ state is approximately 35.0 GHz and B approximately 42.6 GHz for the $2v_3$ state of HCN. At room temperature, according to the Boltzmann distribution, maximum population occurs in the rotational state with j=9 for $C_2H_2$ and j=8 for HCN.

Figure 18:
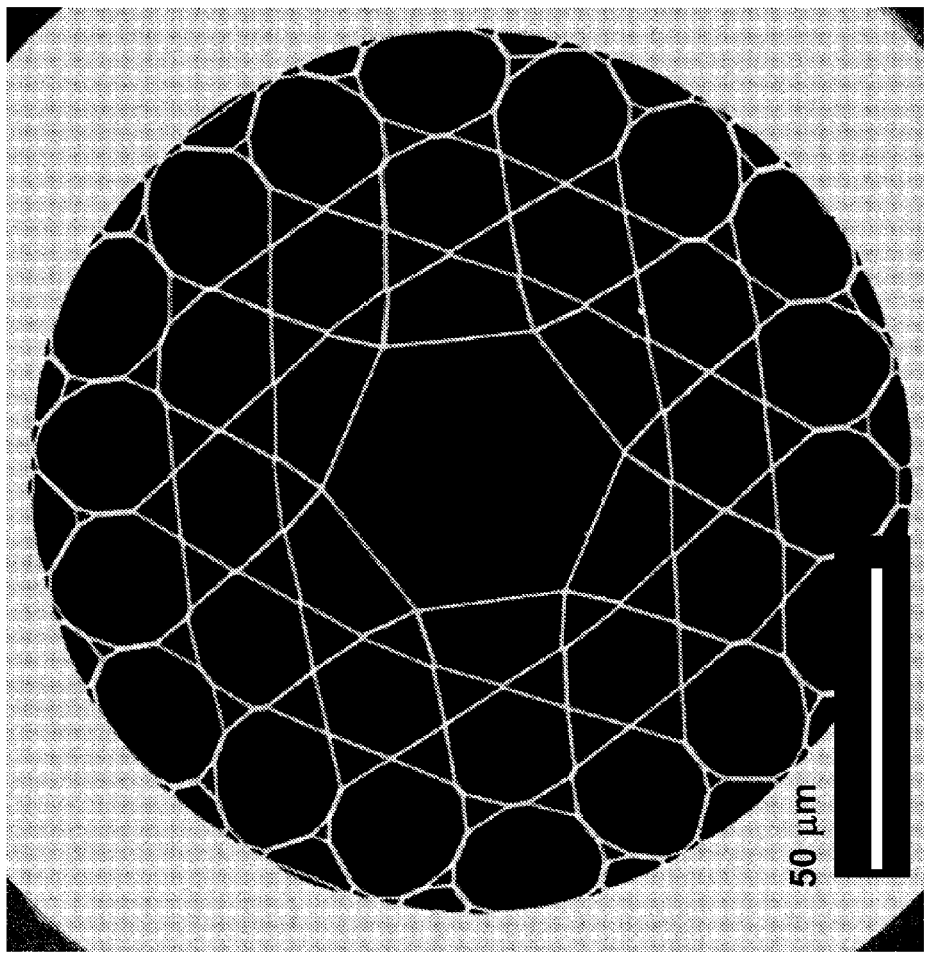
FIG. 18 shows a cross section of a kagome structured hollow core photonic crystal fiber that can be filled with a gas, in accordance with various embodiments.

FIG. 18 shows a cross section of a kagome HC-PCF that can be used in the setup of FIGS. 1, 8, or other application system designs, and filled with a gas, such as, but not limited to, $C_2H_2$ or HCN. In an example setup, kagome HC-PCF can be structured for use as a 1.65-m kagome structured hollow core fiber with a core diameter of approximately 40 µm. In an experiment, both ends of the fiber were terminated in vacuum chambers and the chambers were filled with a few torr of $C_2H_2$, for example. The measured transmission loss for the fiber was approximately 0.75 dB/m at the pump wavelength and approximately 20 dB/m at the lasing wavelength. An OPO was tuned to resonance with the $v_1+v_3$ (R7) transition of $C_2H_2$ at approximately 1.521 µm and was coupled to the fiber using appropriate optics. The $C_2H_2$ pressure was varied in the range 0.5 to 20 torr and the laser output was recorded using a fast detector for input coupled pulse energies in the range of approximately 10 nJ to 2 µJ Suitable filters were used to separate laser emission from pump at the output. The laser spectrum was recorded using a near infrared (NIR) scanning spectrometer.

At a pressure of 7 torr for a acetylene filled HC-PCF laser, the spectrum profile of the $C_2H_2$ filled HC-PCF is shown in FIG. 2. As discussed above, the lasing threshold is about 200 nJ and varies with pressure. The observed laser lines of the acetylene filled HC-PCF laser were the same as those seen by a conventional gas cell and cavity arrangement to generate lasing.

Figure 19:
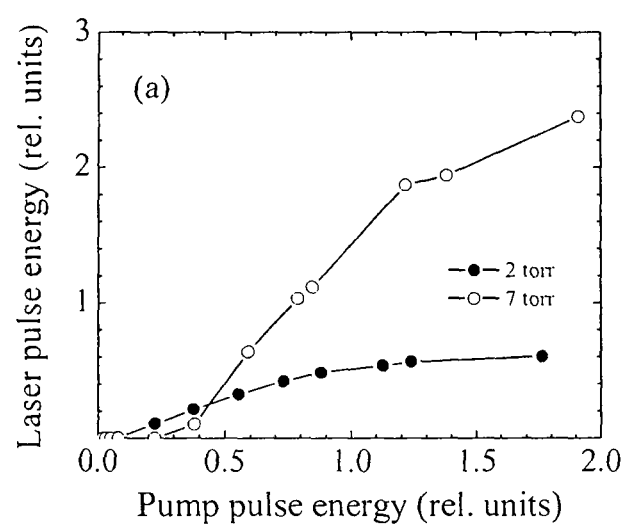
FIG. 19 shows the hollow core photonic crystal fiber laser output as a function of pump pulse energy for two pressures, in accordance with various embodiments.

FIG. 19 shows the HC-PCF laser output as a function of pump pulse energy for two pressures, 2 and 7 torr of acetylene. Each curve indicates the onset of saturation as the increasing pump pulse energy starts to saturate the absorption transition. At lower pressures, saturation is more pronounced.

Figure 20:
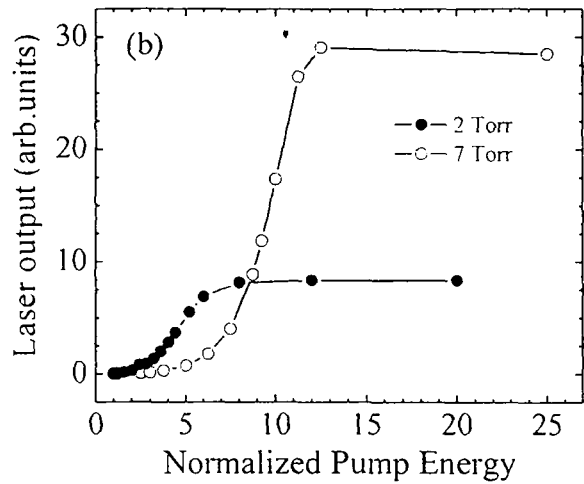
FIG. 20 shows simulated laser output as a function of input energy using a saturable absorber/amplifier model, in accordance with various embodiments.

A model can be used to qualitatively predict the trends observed in the experiment. In the model, a Gaussian pump pulse in resonance with the gas is sent through the fiber, which creates a population inversion. The laser pulse develops from spontaneous emission. In this model, both pump and probe (laser) saturate the respective transitions. The linear fiber losses are taken into account in the model. FIG. 20 shows simulated laser output as a function of input energy using a saturable absorber/amplifier model. The results of the model are in qualitative agreement with experiment. The model also can be used to predict the optimum fiber length for maximum laser output.

Figure 21:
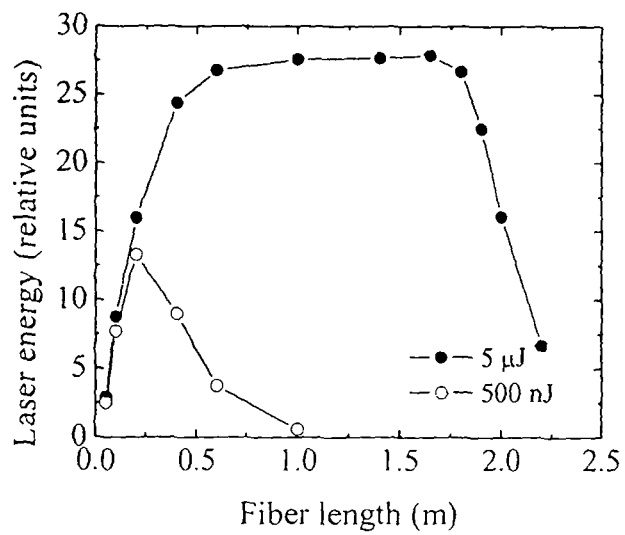
FIG. 21 shows laser energy as a function of fiber length as predicted by the model of FIG. 20, in accordance with various embodiments.

FIG. 21 shows laser energy as a function of fiber length as predicted by the model. FIG. 21 shows, as an example, the calculated laser energy as a function of fiber length for two input energies, 500 nJ and 5 µJ, for an acetylene pressure of 7 torr. As is evident, there is an optimum fiber length for a given input energy and pressure. This optimum may arise from the interplay of pump depletion along the fiber and the relatively large linear losses at the laser wavelength in the current system reflected in FIGS. 1 and 8.

In various embodiments, a class of optically pumped gas lasers is provided by optically pumped gas lasers based on population inversion. The gas can be confined to a HC-PCF whose transmission spans several octaves to reach the mid-IR spectral region. Various embodiments of such lasers can produce light near 3 µm when pumped at approximately 1.5 µm, offering a potentially robust, efficient, and compact means of producing step-tunable eye-safe mid-IR radiation well suited to a multitude of applications.

Compared to solid state laser media, gases have attractive properties including high damage thresholds, the possibility of heat dissipation through gas circulation, relatively large gain cross-sections, and emission frequencies from the near to far-infrared. A variety of optically pumped gas lasers have been demonstrated, from the earliest $CH_3F$, $CO_2$, and OCS, to alkali vapor, CO, HBr, $C_2H_2$ and HCN. Some of these mid-IR lasers can be pumped via ro-vibrational overtones at wavelengths in the optical-fiber telecommunication bands where commercial pump sources are well established and readily available. Early work with HBr gas cells pumped at 1.3 µm has demonstrated lasing at approximately 4 Ina with conversion efficiencies of approximately 25%. More recently, cascade lasing in HBr at wavelengths near 4 µm suggests that conversion efficiencies exceeding 50% are possible. The main disadvantage that has limited widespread use of gas lasers and prevented their integration into many practical optical systems is the bulky, fragile packaging necessary to achieve long optical path lengths and extract appreciable laser output due to the dilute nature of gas media.

The problem of weak interaction between light and gas has been addressed with the advent of a gas-filled HC-PCF, whereby light and the gas phase are confined to areas on the order of 100 µm$^2$ over distances of tens of meters. A variety of nonlinear optical phenomena have been demonstrated using HC-PCF including the development of a gas-filled fiber Raman laser and a multi-octave spanning Raman frequency comb. A HC-PCF consists of a hollow, air-filled core surrounded by a periodic array of smaller holes. Two classes of HC-PCFs have emerged. The first guides via a photonic band-gap and has demonstrated narrow-band guidance near 3 µm, but not the octave-spanning guidance. The second, represented by a kagome HC-PCF, guides via a mechanism akin to Von Neumann and Wigner states whereby core and cladding modes can coexist essentially without coupling to each other. As a result of this salient feature, a kagome HC-PCF permits ultra-broad, multi-octave spanning spectral guidance, with reasonably low loss (<1 dB/m) across a broad spectrum.

These fibers can be spliced to solid-core fibers, creating compact, robust sealed gas cells that can readily be integrated into devices.

Figure 22A:
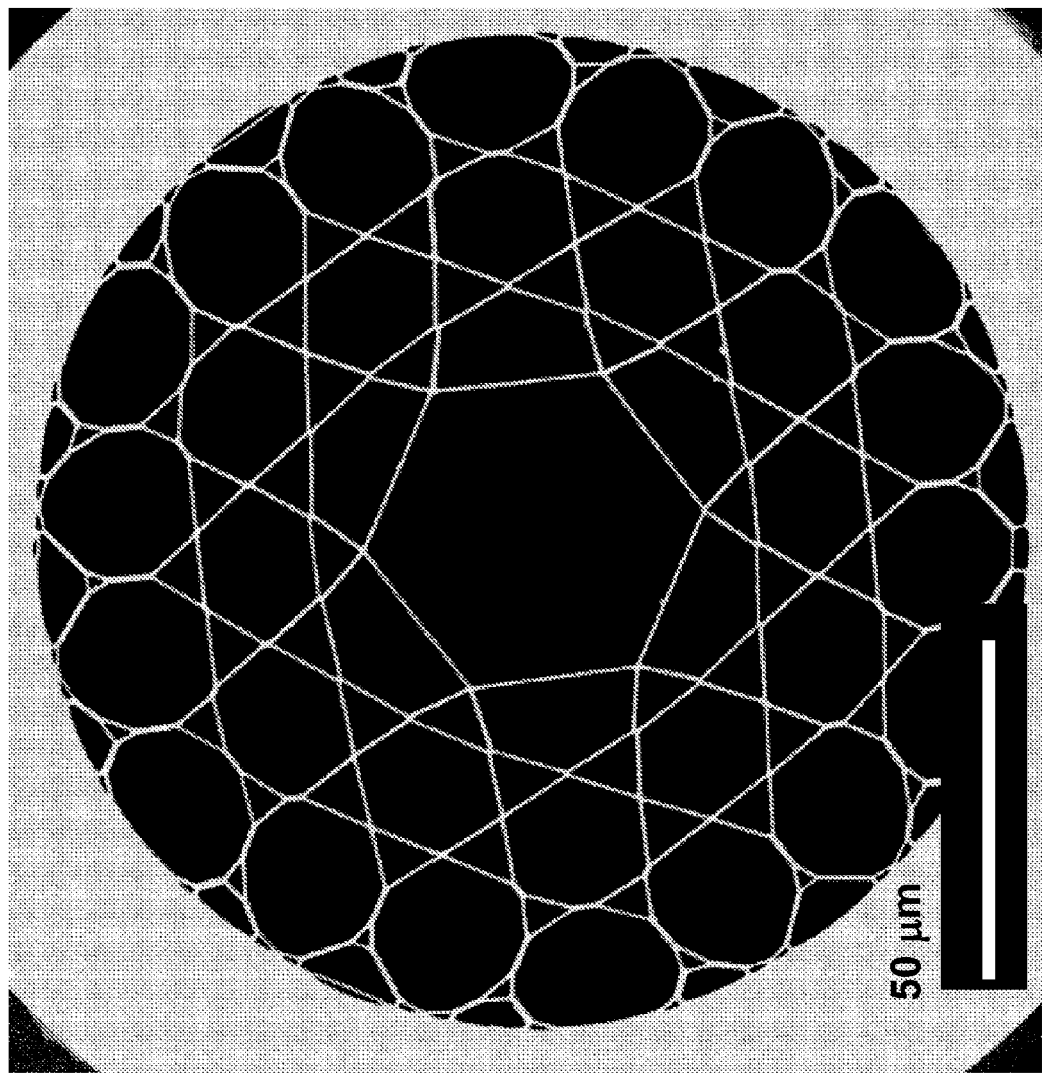
FIG. 22A-C shows cross section and guided modes of a kagome fiber used to provide multi-octave spanning guidance that includes the mid-IR, in accordance with various embodiments.
Figure 22B:
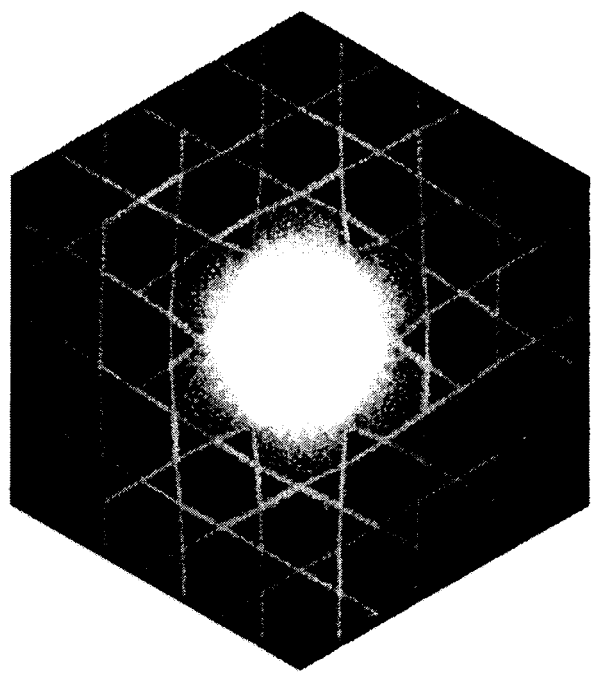
Figure 22C:
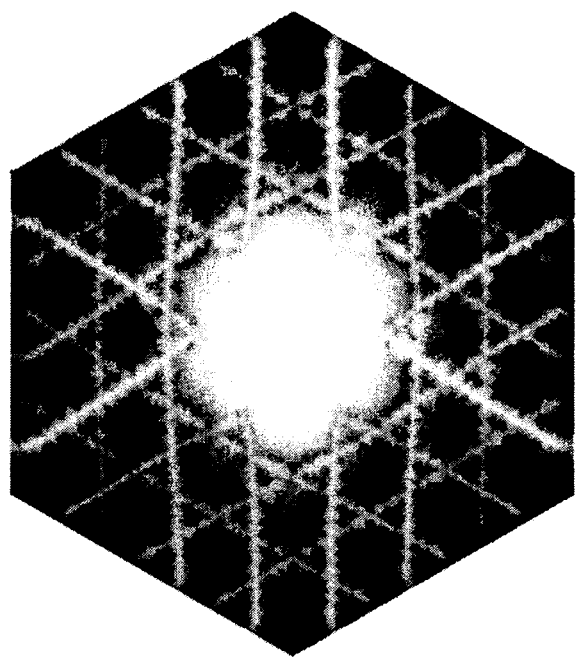

FIG. 22A-C shows cross section and guided modes of a kagome fiber used to demonstrate multi-octave spanning guidance that includes the mid-IR. FIG. 22A shows a scanning electron microscope image of the cross section of the fiber used. The diameter of the hollow core varies from 42.4-48.3 µm. The fiber pitch is approximately 23 µm, and the typical strut thickness is approximately 0.4 µm. FIG. 22B shows calculated core mode profiles at 1.52 µm. FIG. 22C shows a calculated core mode profiles at 3.12 µm.

The fiber can be formed from high purity, low OH content (approximately 0.1 ppm) fused silica using a stack and draw technique. Light out to approximately 3.4 µm is reasonably well guided in the fiber, even though fused silica exhibits strong absorption at wavelengths beyond approximately 3 µm, because the light that propagates is mostly confined to the hollow central core. A 3-ring cladding surrounds a single-cell defect core approximately 45 µm in diameter, with excellent guidance at the pump wavelength of 1.52 µm and weak guidance near the laser wavelengths in the mid-IR.

Figure 23:
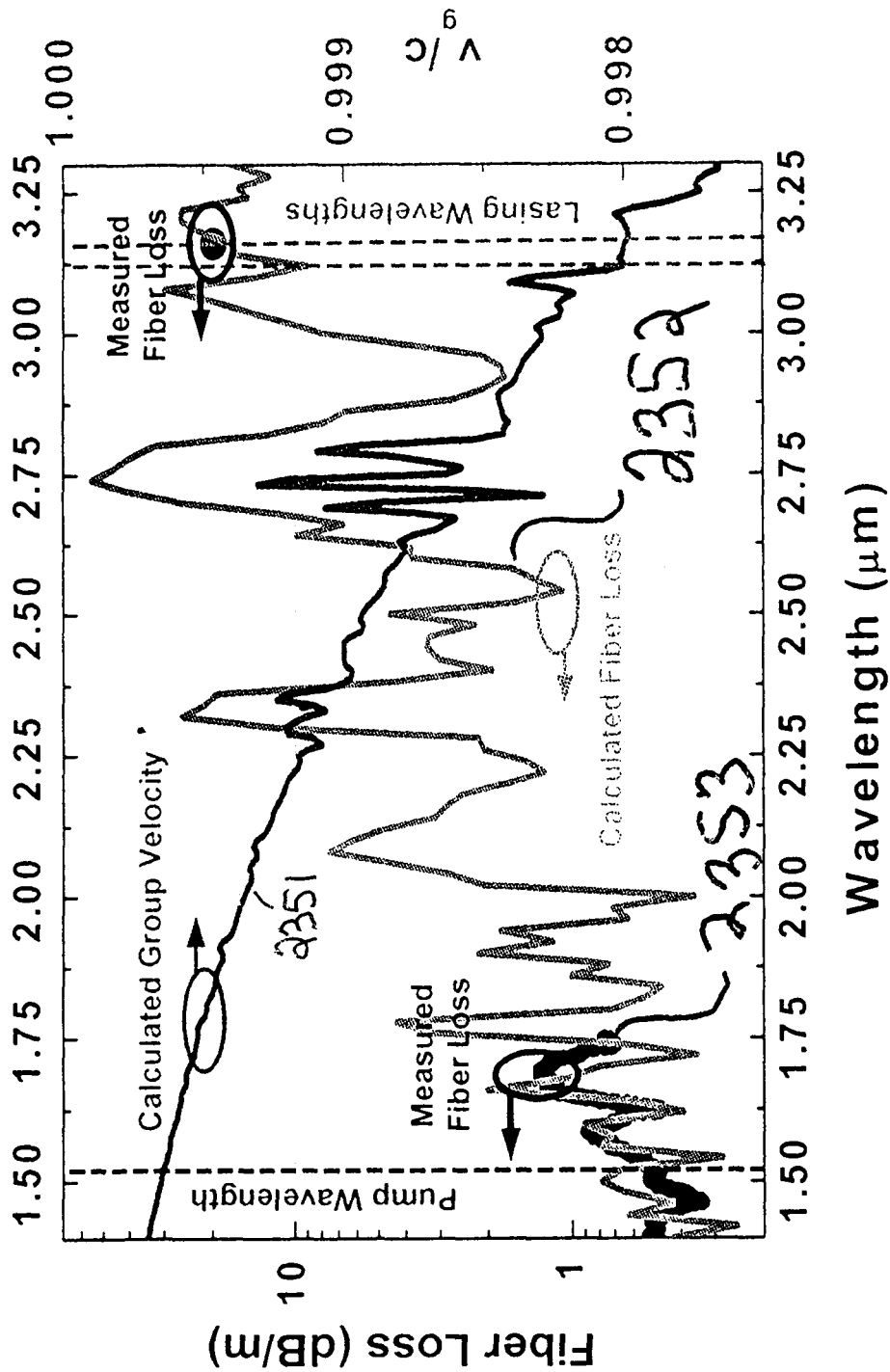
FIG. 23 shows the measured fiber loss spectrum and calculated fiber loss spectrum and the calculated group velocity of the kagome fiber of FIG. 22A, in accordance with various embodiments.

FIG. 23 shows the measured fiber loss spectrum 2353 and calculated fiber loss spectrum 2352 and the calculated group velocity 2351 of the kagome fiber of FIG. 22A. Standard cut-back measurements were performed to measure the wavelength dependent loss of the fiber. A broadband optical source and an optical spectrum analyzer were used at wavelengths below 1.75 µm. The data at 3.16 µm was taken using the output of an optical parametric oscillator coupled through the fiber and detected by a PbSe photodetector. The measured fiber loss is less than 0.5 dB/m near 1.5 µm and is 20 dB/m at 3.16 µm. The calculated fiber loss can be a result of the confinement loss of the fiber, which arises partially from the fact that the microstructured cladding region is finite in size, and partly from the intrinsic guidance mechanism of the fiber whereby there is a residual coupling between the cladding continuum modes and the guided core modes. This results in a light leakage from core guided modes though the microstructured cladding into the outer bulk silica. The confinement loss was calculated using finite element analysis software, which was also used to solve the fiber modes. The measured and calculated fiber losses are in good agreement, allowing fast and accurate numerical customization and optimization of fiber loss profiles.

Figure 24:
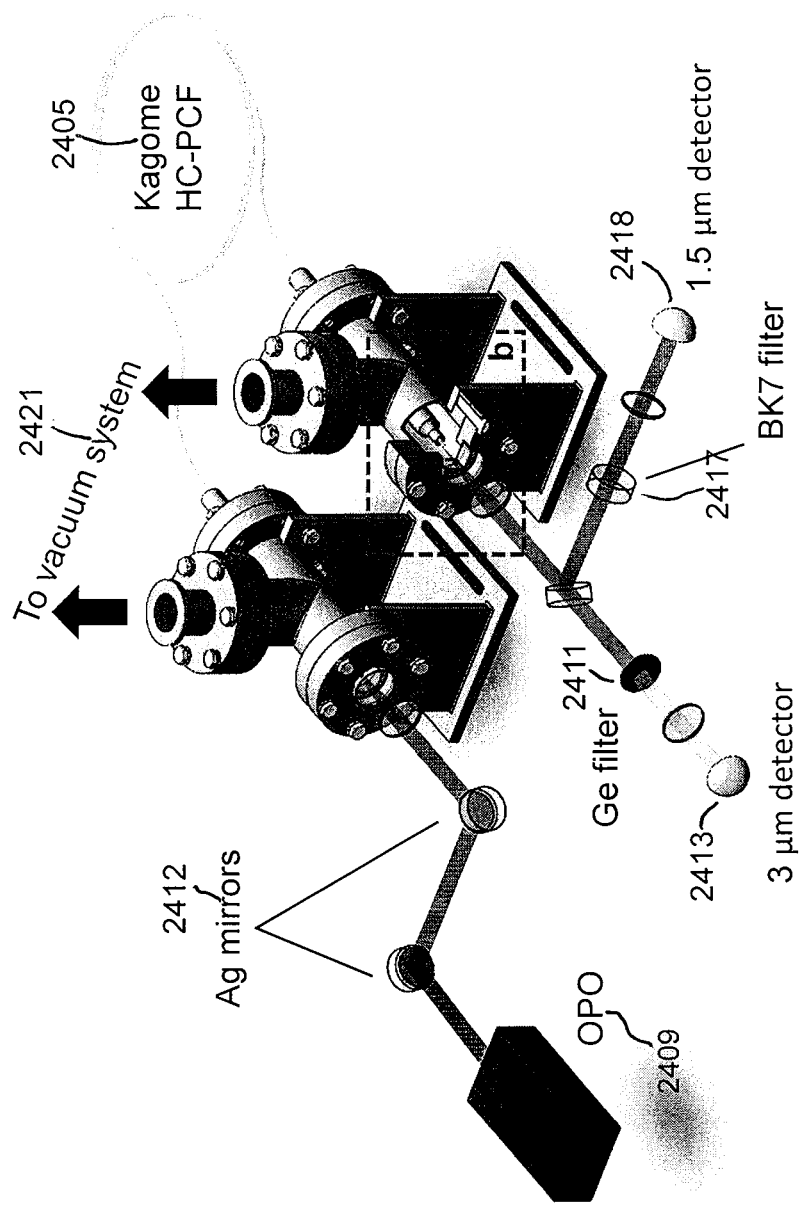
FIG. 24 shows an example experimental laser setup similar to the setup of FIG. 1, in accordance with various embodiments.
Figure 25:
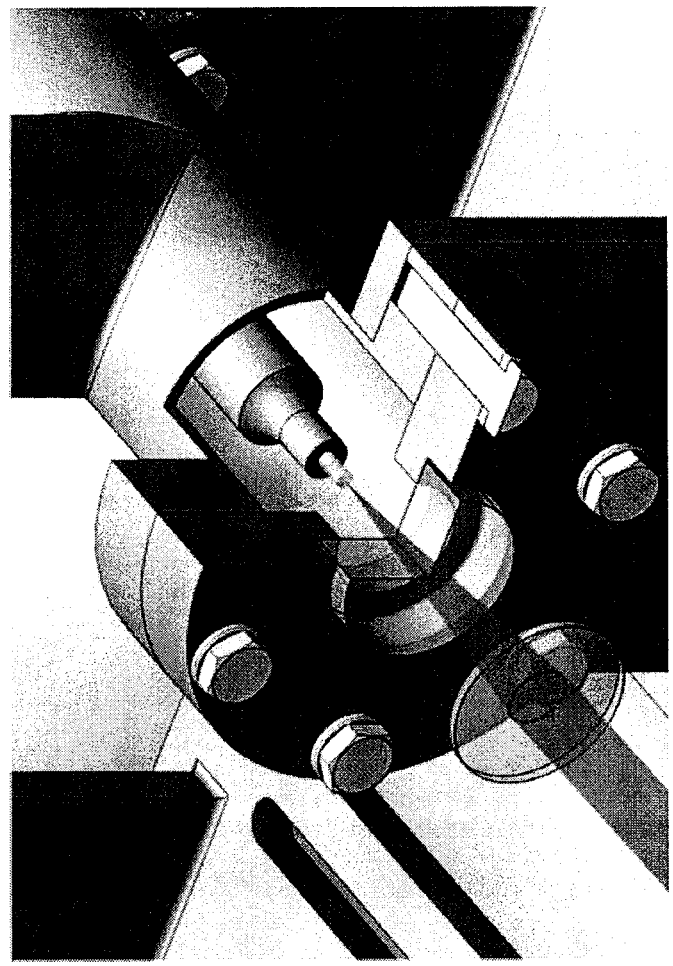
FIG. 25 shows an end of a kagome fiber supported inside a vacuum chamber of FIG. 24, in accordance with various embodiments.

FIG. 24 shows an example experimental laser setup similar to the setup of FIG. 1. Pulses from an OPO 2409 with a center wavelength of approximately 1.5 µm and 5 ns duration are coupled into a kagome structured HC-PCF 2405 containing low pressure acetylene gas. Pump radiation is absorbed by the gas and laser radiation is detected from ro-vibrational transitions at wavelengths in the mid-IR. Laser energy is filtered from pump energy by a polished germanium wafer 2411 and detected by a fast, room-temperature HgCdTe photovoltaic detector 2413. The heart of the laser is the hollow PCF waveguide, which contains the gas-phase gain medium and serves as the laser cavity by guiding only emissions that fall within the guided modes of the fiber, effectively providing spectral and spatial feedback leading to coherent laser oscillation. Both ends of the kagome fiber are supported inside vacuum chambers 2421 within 1 cm of the windows, as shown in FIG. 25 providing a close-up showing a fiber end suspended in a vacuum chamber 2421 of FIG. 24, allowing light to be coupled through the evacuated fiber.

Figure 26:
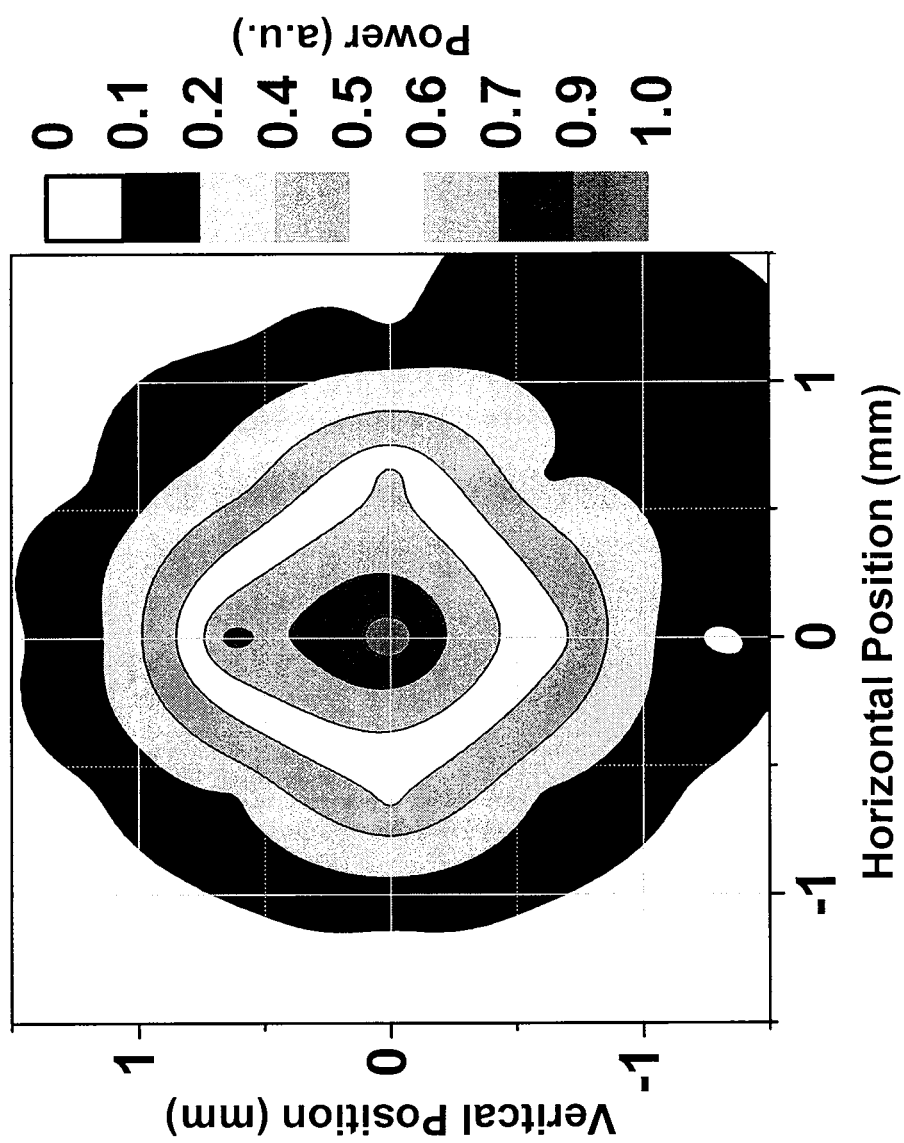
FIG. 26 shows the measured output mode profile in the setup of FIG. 24, in accordance with various embodiments.

Experiments were performed with 1.65-m and 0.95-m long HC-PCFs. Filling the evacuated fiber with acetylene ($^{12}C_2H_2$) gas to equilibrium pressures of up to tens of torr takes only minutes owing to the relatively large fiber core, and implies average flow rates of approximately $10^{10}$ molecules/s. Use of a 19-cell defect fiber with core diameters of 50-70 µm would further decrease the filling times and allow even faster flow rates. BK7 glass optics 2417 couple in pump light at approximately 1.5 µm, while $CaF_2$ optics couple light out. The laser is pumped with OPO 2409 producing pulses roughly 5 ns in duration with a bandwidth of about 3.5 GHz tuned to resonance with the $v_1+v_3$ (R7) ro-vibrational transition in $^{12}C_2H_2$, λ=1521.06 nm. The pump pulse energy incident on the fiber can be kept below 100 µJ to avoid damage. Polished germanium wafers filter 2411 transmitted pump light from mid-IR laser pulses exiting the fiber. The measured output mode profile is shown in FIG. 26 illustrating a far-field mode profile: power of the collimated 3 µm beam passing through a 750-µm diameter circular aperture as the aperture is scanned transverse to the beam. A fast InGaAs photodetector 2418 measures pump pulse energy while a fast HgCdTe photodetector 2413 observes mid-IR pulses.

Pump pulses excite acetylene molecules from the J=7 rotational state of the vibrational ground state to the J=8 rotational state of the $v_1+v_3$ vibrational manifold (FIG. 3). Acetylene molecules can then leave this excited state via radiative transitions to the $v_1$ vibrational state with corresponding emission wavelengths in the 3 µm region. Alternatively, molecules initially in the excited state may exchange energy nonradiatively through intermolecular collisions and collisions with the fiber wall, processes that can decrease the overall laser efficiency. The relative contribution of wall collisions is expected to be small at pressures above 2 torr, where the calculated mean free path of gas molecules is <20 µm. Just as in a free space acetylene laser, two peaks in the laser spectrum are seen at 3.12 µm and 3.16 µm (FIG. 2). These peaks correspond to the dipole allowed transitions ($\Delta J=\pm 1$) from the J=8, $v_1+v_3$ excited state to the J=7 and J=9 rotational states of the $v_1$ vibrational state corresponding to wavelengths of 3123.2 nm and 3162.4 nm, respectively. The absence of any other peaks indicates insufficient time for molecules in the excited state to rotationally mix through intermolecular collisions before the onset of lasing and vibrational relaxation. Measured total removal rates from the upper pump level are approximately $10^{-9}$ cm$^3$s$^{-1}$.

FIG. 5, as discussed with respect to the use of the setup of FIG. 1, shows laser pulse energies measured at various acetylene gas pressures for a fixed pump energy. The maximum laser pulse energy was approximately 6 nJ measured at an acetylene pressure of 7 torr. Delays between the transmitted pump and laser pulses did not exceed 5 ns. Laser pulse durations were observed to be between approximately 3 ns and 5 ns. The lasing threshold occurred at about 200 nJ of coupled pump pulse energy and varied with pressure. The slope efficiency was only approximately 1% in comparison with about 10% from the free space acetylene laser, but can be improved by reducing the fiber attenuation at the laser wavelength through optimization of the fiber length and pitch. Neglecting relaxation processes, the maximum possible slope efficiency for this laser can be 25% as a result of saturating both the pump and lasing transitions. In the limit of lossless fiber and 25% efficiency, achievable pulse energies may be limited by the fiber damage threshold. Damage fluences for 8-ns pulses at 1064 nm on the order of 100 J/cm$^2$ were observed for the cladding in HC-PCFs, which roughly corresponds to the critical fluence of bulk fused silica. In contrast, a roughly 10 times higher fluence was demonstrated by the guided mode without causing catastrophic damage. Assuming that the damage fluence scales as the square root of the pulse duration and is rather wavelength independent, an estimate for the maximum pump energy that can be coupled into the fiber can be obtained on the order of 10 mJ, resulting in a maximum laser energy of a few mJ. This energy limit can be increased through the use of larger core fibers, longer pulse durations, and more efficient lasing schemes.

A model can be used to qualitatively predict the trends observed in the setups of FIGS. 1, 8, and 24 or other designs. The model system can be comprised of only three states: a ground state, the pumped excited state, and a terminal excited state with no direct path for population to transfer to or from the ground state during the time scale of interest. The absorption cross-section for the pump transition can be estimated as $7.7 \times 10^{-18}$ cm$^2$. With data for the stimulated emission cross-section for the lasing transition not available, it is can be assumed that it is of the same order of magnitude as that for the $v_3 \rightarrow v_0$ transition, which can be estimated to be approximately $2.2 \times 10^{-16}$ cm$^2$ using the known Einstein A coefficient. In the model, a Gaussian pump pulse 5 ns long and 2 GHz in bandwidth spectrally centered on resonance with the gas at 1.52 μm enters the fiber, creating a population inversion. The laser pulse develops from spontaneous emission and co-propagates with the pump, where linear fiber losses are accounted for. The model predicts, for the experiment discussed, an optimum pressure, experimentally observed in FIG. 5, which is a function of the fiber length and pump energy. The optimum pressure essentially occurs when a given pump pulse energy just creates enough gain to balance the fiber loss at the end of the fiber. Any further increase in pressure causes additional pump absorption, resulting in more loss than gain before the fiber end. A smaller pressure dependent effect arises from the linewidth of the pump transition (approximately 1 GHz at 7 torr).

Figure 27:
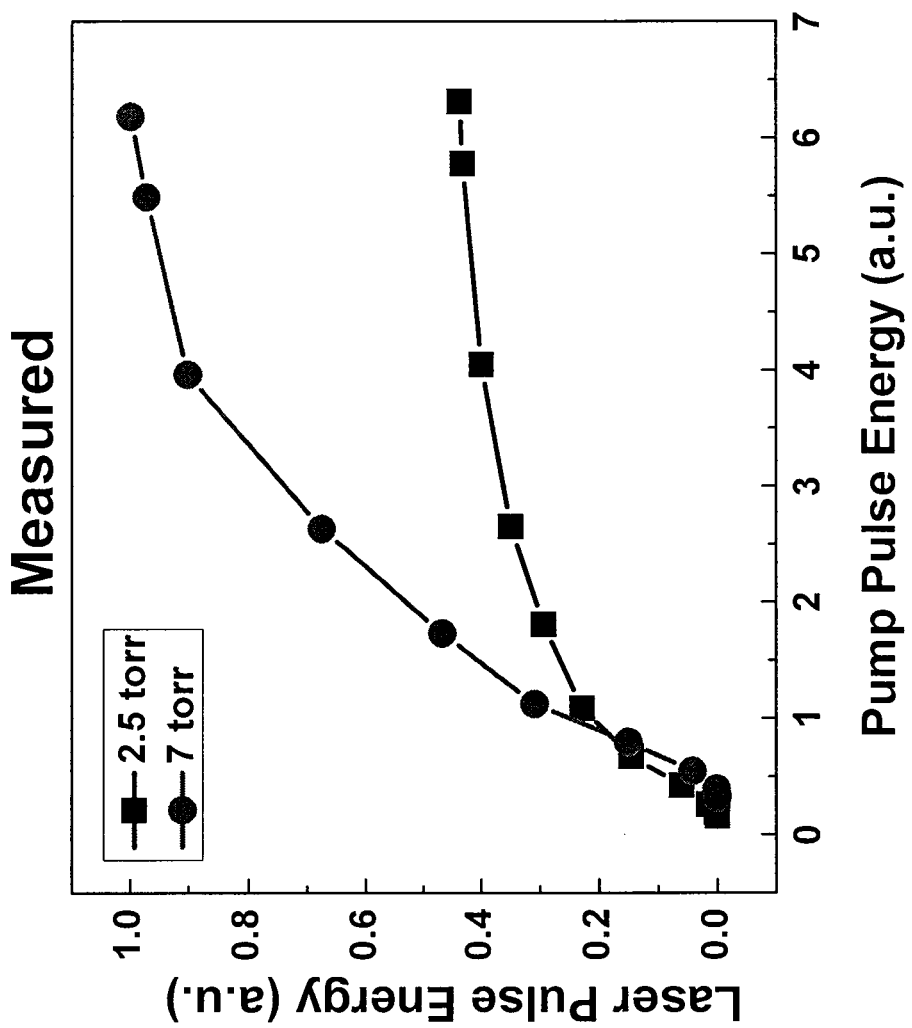
FIG. 27 shows the measured laser pulse energies as a function of pump pulse energy for various levels of pump pulse energy coupled into a fiber containing $^{12}C_2H_2$ at two pressures, in accordance with various embodiments.
Figure 28:
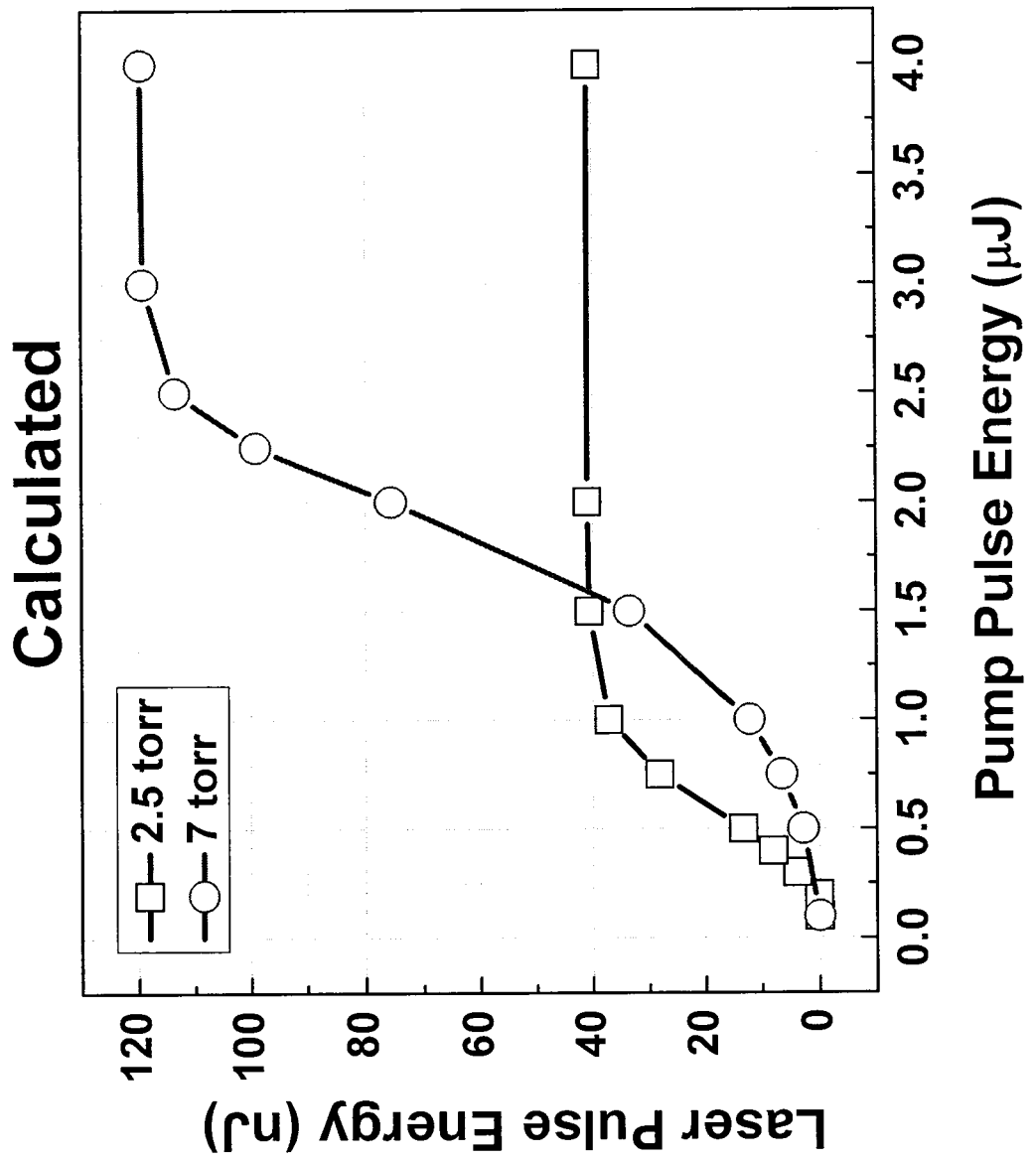
FIG. 28 shows predicted laser pulse energies as a function of pump pulse energy for various levels of pump pulse energy coupled into a fiber containing $^{12}C_2H_2$ at two pressures, in accordance with various embodiments.

FIG. 27 and FIG. 28 shows the measured and predicted laser pulse energies, respectively, as a function of pump pulse energy for various levels of pump pulse energy coupled into a 0.9 m long fiber containing $^{12}C_2H_2$ at pressures of 2.5 and 7 torr. The experimental and calculated data are in good qualitative agreement, showing exponential-like small signal gain followed by the onset of saturation as the pump pulse begins to saturate the gas absorption at the end of the fiber. Only relative comparisons between experiment and calculation can be made because the exact fiber-to-free space coupling efficiencies are not known. Cut-back measurements to determine the actual efficiencies are complicated by time-dependent fluctuations in the spatial mode and center frequency of pump pulses from the OPO.

Figure 29:
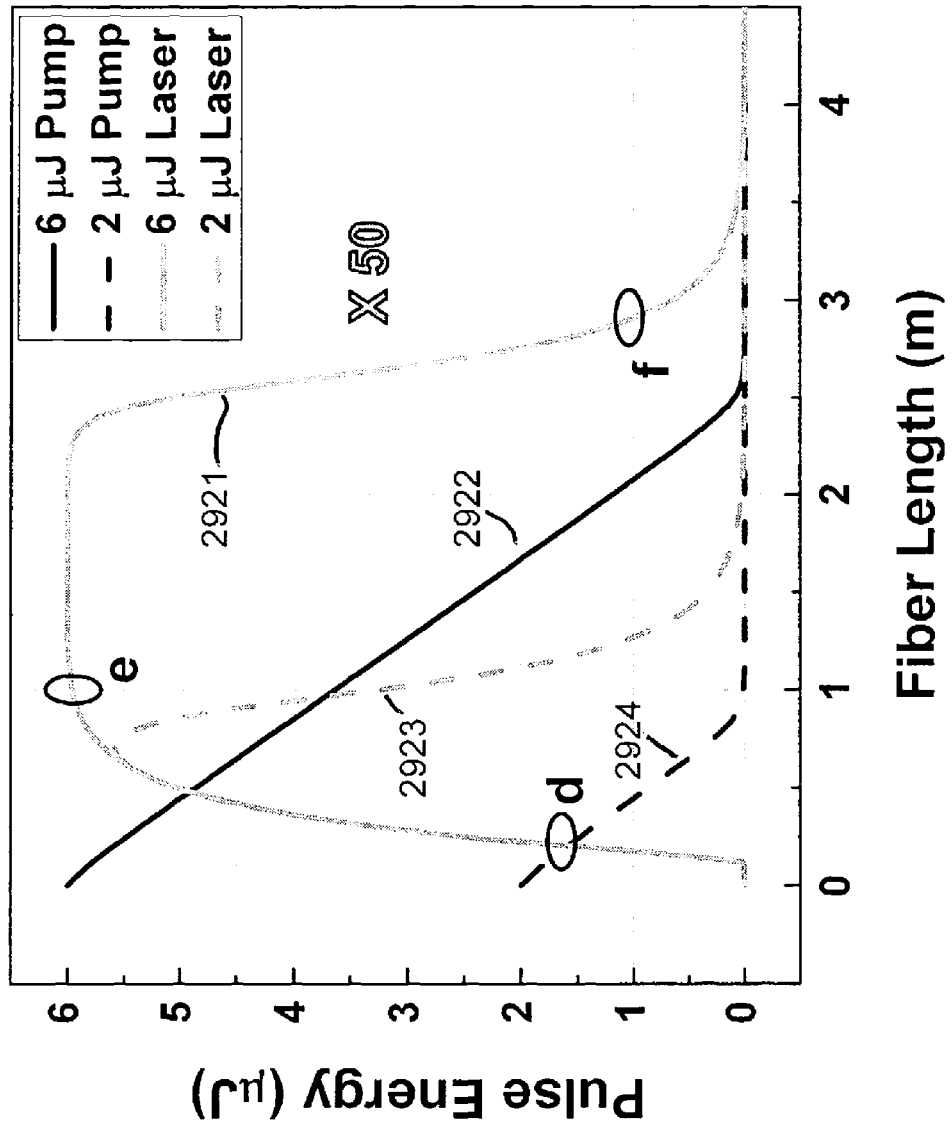
FIG. 29 shows mid-infrared laser output as a function of fiber length as predicted by a model, in accordance with various embodiments.

FIG. 29 shows mid-IR laser output as a function of fiber length as predicted by the model. Curve 2921 shows calculated laser energy at different positions along the fiber length containing 7 torr of $^{12}C_2H_2$ gas for launched pump pulse energy at 6 μJ, where the laser energy is multiplied by a factor of 50. Curve 2922 shows calculated pump pulse energies at different positions along the fiber length containing 7 torr of $^{12}C_2H_2$ gas for launched pump pulse energy at 6 μJ. Curve 2923 shows calculated laser energy at different positions along the fiber length containing 7 torr of $^{12}C_2H_2$ gas for launched pump pulse energy at 2 μJ, where the laser energy is multiplied by a factor of 50. Curve 2924 shows calculated pump pulse energies at different positions along the fiber length containing 7 torr of $^{12}C_2H_2$ gas for launched pump pulse energy at 2 μJ. When pumping at 6 μJ (curves 2921 and 2922), the first knee present in the laser energy curve occurs when the saturated gain approximately equals the linear fiber loss for the laser radiation. The plateau in the output power persists while the pump is able to maintain (saturated) gain that equals the linear fiber loss for the laser radiation, ending when the depleted pump cannot maintain sufficient population inversion.

Figure 30:
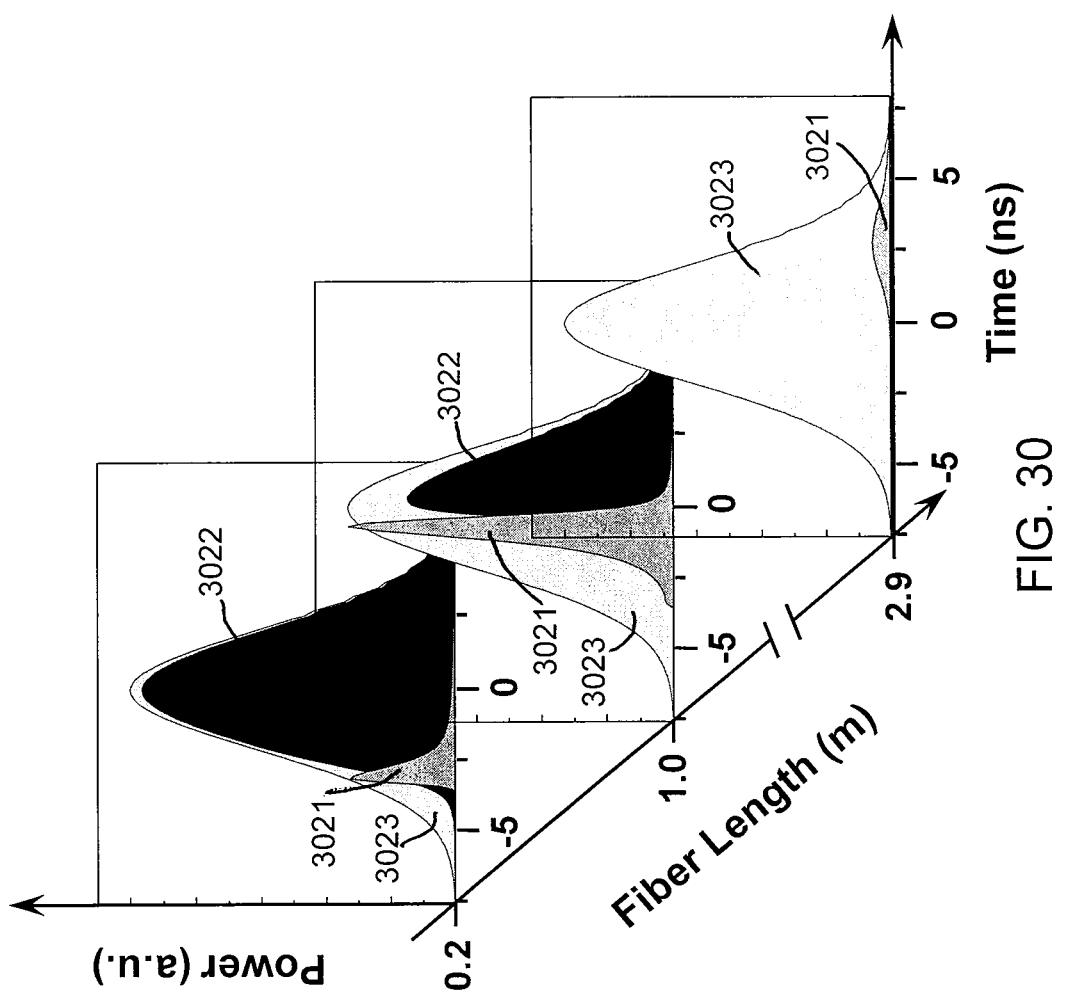
FIG. 30 shows the evolution of pump and laser pulse power calculated at different positions along the length of the fiber for a launched pump pulse energy, in accordance with various embodiments.

FIG. 30 shows the evolution of pump (region 3022) and laser (region 3021) pulse power calculated at different positions along the length of the fiber for a launched pump (constant region 3023) pulse energy of 6 μJ. The laser power is scaled up by a factor of 5.5. Initially the laser pulse develops at the leading edge of the undepleted pump pulse (length of 0.2 m). As the leading edge of the pump is absorbed and saturates the transition, the positive net gain window shifts towards later times during the pump pulse. As a result, the laser pulse broadens and its center moves backwards (length of 1.0 m). At long fiber lengths the pump is almost completely absorbed and the laser pulse energy begins to decrease as the pump can no longer sustain the inversion necessary to compensate the fiber loss (length of 2.0 m). Additionally, the temporal width of the laser pulse broadens as it propagates along the fiber and never exceeds the 5-ns duration of the launched pump pulse.

Realization of a gas fiber laser based on population inversion holds great promise for coherence generation applications as well as for engineering high power, portable and robust, all fiber mid-IR sources. Gas-filled fiber laser sources can effectively be engineered at numerous wavelengths difficult to obtain with other technologies by carefully selecting the gas and designing the optical fiber. The gas can be selected that absorbs at wavelengths where inexpensive, high-power pump sources exist, and lase at a wavelength of interest. The associated fiber can be selected to be highly transmissive at both the pump and laser frequencies while suppressing lasing on unwanted transitions. While the performance of solid core fiber lasers at high powers can be limited by the onset of nonlinear processes such as Brillouin and Raman scattering, gas-filled HC-PCF lasers can be expected to surpass these limits and have higher thresholds for damage, because no glass or other host material is present in the high intensity region of the propagating modes. Thus, phase-locking multiple gas-filled fiber lasers together may achieve higher ultimate powers than can be realized with solid-core systems. Sealing the fiber permits an all-fiber device, facilitating easy integration into optical systems. Many potential applications use CW operation of a laser. This operation may rely on fast repopulation of the ground state, which may favor asymmetric molecules or require buffer gases for tailored energy transfer. The addition of buffer gases may speed rotational mixing of the excited state population, remove population from unwanted vibrational states, and accelerate heat dissipation. Furthermore, extremely efficient molecular CW lasers with very small quantum defects similar to alkali vapor lasers may be appropriate with PCFs.

Although specific embodiments have been illustrated and described herein, it will be appreciated by those of ordinary skill in the art that any arrangement that is calculated to achieve the same purpose may be substituted for the specific embodiments shown. Upon studying the disclosure, it will be apparent to those skilled in the art that various modifications and variations can be made in the devices and methods of various embodiments of the invention. Various embodiments can use permutations and/or combinations of embodiments described herein. Other embodiments will be apparent to those skilled in the art from consideration of the specification and practice of the embodiments disclosed herein. It is to be understood that the above description is intended to be illustrative, and not restrictive, and that the phraseology or terminology employed herein is for the purpose of description.

What is claimed is:

1. An apparatus comprising:
a hollow optical fiber;
a gas filling the hollow optical fiber, the gas selected such that the hollow optical fiber filled with the gas is arranged to operate as a laser based on population inversion generated in the gas; and
a pump laser having an operating frequency, the pump laser arranged with the hollow optical fiber to match the operating frequency with a transition energy of the gas with respect to resonance to provide the population inversion, wherein the transition energy is correlated to rotational states, vibrational states, or a combination of rotational states and vibrational states of the gas.

2. The apparatus of claim 1, wherein the hollow optical fiber comprises a hollow core photonic crystal fiber.

3. The apparatus of claim 1, wherein the gas includes one of acetylene ($C_2H_2$), hydrogen cyanide, (HCN), carbon monoxide (CO), carbon dioxide ($CO_2$), hydrogen bromide (HBr), nitrous oxide ($N_2O$), hydrogen sulfide ($H_2S$), carbonyl sulfide (OCS), $I_2$, DF, HP, IBr, HCl, HI, or an isotopic equivalent thereof.

4. The apparatus of claim 1, wherein the pump laser is arranged to direct a pump laser signal into the hollow optical fiber, the pump laser signal having a wavelength shifted by a nonlinear optical process to become resonant with the gas to attain the population inversion during propagation through the fiber.

5. The apparatus of claim 1, wherein a wavelength of a laser output from the hollow optical fiber is about twice the wavelength of the pump laser signal, when pumped by the pump laser.

6. The apparatus of claim 1, wherein the wavelength of the pump laser signal can be converted through nonlinear optical processes while radiation propagates through the fiber.

7. The apparatus of claim 1, wherein the pump laser includes an optical parametric oscillator.

8. The apparatus of claim 1, wherein the apparatus includes filters to separate an output of the hollow optical fiber at the wavelength of the pump laser signal from an output of the hollow optical fiber at a wavelength corresponding to the hollow optical fiber filled with the gas lasing based on the population inversion of the gas.

9. The apparatus of claim 1, wherein the hollow optical fiber filled with the gas is sealed.

10. The apparatus of claim 1, wherein the hollow optical fiber is configured between two mirrors forming an optical cavity.

11. The apparatus of claim 10, wherein the mirrors are disposed at ends of the hollow optical fiber such that the hollow optical fiber is sealed off by the mirrors.

12. The apparatus of claim 10, wherein the mirrors are disposed outside the gas enclosed part of the hollow optical fiber such that part of a cavity mode includes free-space.

13. The apparatus of claim 1, wherein the gas filled hollow optical fiber is arranged as an optical amplifier to provide seed light when optically pumped.

14. The apparatus of claim 1, wherein the apparatus includes a buffer gas, the buffer gas selected to mitigate thermal effects, adjust molecular relaxation rates, provide for energy transfer, or combinations thereof.

15. The apparatus of claim 1, wherein the laser based on population inversion is operably combined with nonlinear frequency conversion of a pump signal and/or laser radiation of the laser based on population inversion.

16. The apparatus of claim 1, wherein the apparatus includes one or more additional gases operably excited through energy transfer from the gas optically pumped such that the excited additional gases are inverted and act as an active laser medium.

17. The apparatus of claim 1, wherein the gas filled hollow optical fiber is arranged such that when optically pumped, the gas filled hollow optical fiber and the generated population inversion operate as an optical amplifier, amplifying continuous wave and/or pulsed optical signals.

18. The apparatus of claim 17, wherein the apparatus is operable to modify output signal radiation from the optical amplifier using nonlinear processes.

19. An apparatus comprising:
a hollow optical fiber;
a gas cell to provide a gas to fill the hollow optical fiber with the gas, the gas selected such that the hollow optical fiber filled with the gas is arranged to operate as a laser based on population inversion generated in the gas; and
a pump laser having an operating frequency, the pump laser arranged with the hollow optical fiber to match the operating frequency with a transition energy of the gas with respect to resonance to provide the population inversion, wherein the transition energy is correlated to rotational states, vibrational states, or a combination of rotational states and vibrational states of the gas.

20. The apparatus of claim 19, wherein the hollow optical fiber comprises a hollow core photonic crystal fiber.

21. The apparatus of claim 19, wherein the gas includes one of acetylene ($C_2H_2$), hydrogen cyanide, (HCN), carbon monoxide (CO), carbon dioxide ($CO_2$), hydrogen bromide (HBr), nitrous oxide ($N_2O$), hydrogen sulfide ($H_2S$), or carbonyl sulfide (OCS), $I_2$, DF, HF, IBr, HCl, HI, or an isotopic equivalent thereof.

22. The apparatus of claim 20, wherein the hollow core photonic crystal fiber is a kagome lattice based hollow core photonic crystal fiber.

23. The apparatus of claim 19, wherein the pump laser includes an optical parametric oscillator.

24. The apparatus of claim 19, wherein the hollow optical fiber is configured between two mirrors forming an optical cavity.

25. The apparatus of claim 23, wherein the hollow optical fiber is unsealed.

26. The apparatus of claim 19, wherein one end of the hollow optical fiber is disposed in the gas cell and a second end of the hollow optical fiber is disposed in a second gas cell.

27. The apparatus of claim 19, wherein the gas filled hollow optical fiber is arranged as an optical amplifier to provide seed light when optically pumped.

28. The apparatus of claim 19, wherein the apparatus includes a buffer gas, the buffer gas selected to mitigate thermal effects, adjust molecular relaxation rates, provide for energy transfer, or combinations thereof.

29. The apparatus of claim 19, wherein The laser based on population inversion is operably combined with nonlinear frequency conversion of a pump signal and/or laser radiation of the laser based on population inversion.

30. The apparatus of claim 19, wherein the apparatus includes one or more additional gases operably excited through energy transfer from the gas optically pumped such that the excited additional gases are inverted and act as an active laser medium.

31. The apparatus of claim 19, wherein the gas filled hollow optical fiber is arranged such that when optically pumped, the gas filled hollow optical fiber and the generated population inversion operate as an optical amplifier, amplifying continuous wave and/or pulsed optical signals.

32. The apparatus of claim 31, wherein the apparatus is operable to modify output signal radiation from the optical amplifier using nonlinear processes.

33. A method comprising:
    optically pumping a hollow fiber, the hollow fiber filled with a gas, such that a. population inversion is generated in the gas by using a pump laser having an operating frequency that matches a transition energy of the gas with respect to resonance to provide the population inversion, wherein the transition energy is correlated to rotational states, vibrational states, or a combination of rotational states and vibrational states of the gas; and
    providing a laser output from the hollow fiber resulting from the population inversion generated.

34. The method of claim 33, wherein optically pumping the hollow fiber filled with the gas includes optically pumping a hollow core photonic crystal fiber filled with the gas.

35. The method of claim 33, wherein optically pumping the hollow fiber filled with the gas includes optically pumping a hollow fiber filled with one of acetylene ($C_2H_2$), hydrogen cyanide, (HCN), carbon monoxide (CO), carbon dioxide ($CO_2$), hydrogen bromide (HBr), nitrous oxide ($N_2O$), hydrogen sulfide ($H_2S$), or carbonyl sulfide (OCS), $I_2$, DF, HF, IBr, HCl, HI, or an isotopic equivalent thereof.

36. The method of claim 33, wherein the method includes using multiple mutually incoherent pump sources to add to the population inversion of the gas and to increase the amount of the laser output from the hollow fiber resulting from the population inversion.

37. The method of claim 33, wherein optically pumping the hollow fiber filled with the gas includes using a pulsed pumped source.

38. The method of claim 37, wherein using a pulsed pumped source includes using a pulsed pumped source operated with a pump source duration in the range from about 5 ns to about 10 ns.

39. The method of claim 33, wherein optically pumping the hollow fiber filled with the gas includes using a continuous wave pump source.

40. The method of claim 33, wherein the method includes filling the hollow fiber with the gas.

41. The method of claim 40, wherein filling the hollow fiber with the gas includes filling the hollow fiber with one of acetylene ($C_2H_2$), hydrogen cyanide; (HCN), carbon monoxide (CO), carbon dioxide ($CO_2$), hydrogen bromide (HBr), nitrous oxide ($N_2O$), hydrogen sulfide ($H_2S$), or carbonyl sulfide (OCS), $I_2$, DF, HF, IBr, HCl, HI, or an isotopic equivalent thereof.

42. The method of claim 33, wherein the method includes operating the gas filled hollow optical fiber arranged as an optical amplifier to provide seed light when optically pumped.

43. The method of claim 33, wherein the method includes using a buffer gas in the hollow fiber, the buffer gas selected to mitigate thermal effects, adjust molecular relaxation rates, provide for energy transfer, or combinations thereof.

44. The method of claim 33, wherein the method includes combining the laser output with nonlinear frequency conversion of a pump signal and/or the laser output.

45. The method of claim 33, wherein the method includes exciting one or more additional gases in the hollow fiber through energy transfer from the gas optically pumped such the excited additional gases are inverted and act as an active laser medium.

46. The method of claim 33, wherein the method includes operating the optically pumped gas filled hollow fiber as an optical amplifier, amplifying continuous wave and/or pulsed optical signals.

47. The apparatus of claim 46, wherein the method includes modifying output signal radiation from the optical amplifier using nonlinear processes.

* * * * *

UNITED STATES PATENT AND TRADEMARK OFFICE
CERTIFICATE OF CORRECTION

PATENT NO.        : 9,106,055 B2
APPLICATION NO.   : 13/574550
DATED             : August 11, 2015
INVENTOR(S)       : Rudolph et al.

Page 1 of 1

It is certified that error appears in the above-identified patent and that said Letters Patent is hereby corrected as shown below:

In the claims,

In column 17, line 18, in Claim 3, delete "cyanide," and insert --cyanide--, therefor In column 17, line 21, in Claim 3, delete "HP," and insert --HF,--, therefor In column 18, line 29, in Claim 21, delete "cyanide," and insert --cyanide--, therefor In column 18, line 54, in Claim 29, delete "The" and insert --the--, therefor In column 19, line 6, in Claim 33, delete "a." and insert --a--, therefor In column 19, line 21, in Claim 35, delete "cyanide," and insert --cyanide--, therefor In column 20, line 8, in Claim 41, delete "cyanide;" and insert --cyanide--, therefor Signed and Sealed this
Seventeenth Day of May, 2016

Michelle K. Lee
*Director of the United States Patent and Trademark Office*